(12) United States Patent
Klein et al.

(10) Patent No.: US 8,199,196 B2
(45) Date of Patent: Jun. 12, 2012

(54) METHOD AND APPARATUS FOR CONTROLLING VIDEO STREAMS

(75) Inventors: Thierry Etienne Klein, Fanwood, NJ (US); John F. Lertola, Lebanon, NJ (US); Dorel Livescu, Marlboro, NJ (US)

(73) Assignee: Alcatel Lucent, Paris (FR)

( * ) Notice: Subject to any disclaimer, the term of this patent is extended or adjusted under 35 U.S.C. 154(b) by 1273 days.

(21) Appl. No.: 11/862,321

(22) Filed: Sep. 27, 2007

(65) Prior Publication Data

US 2009/0085740 A1   Apr. 2, 2009

(51) Int. Cl.
*H04N 7/18* (2006.01)
*H04N 11/22* (2006.01)
*H04N 9/74* (2006.01)

(52) U.S. Cl. ............... 348/143; 348/455; 348/588

(58) Field of Classification Search .............. 348/143, 348/455, 588
See application file for complete search history.

(56) References Cited

U.S. PATENT DOCUMENTS

| | | | |
|---|---|---|---|
| 6,069,655 A * | 5/2000 | Seeley et al. ............. | 348/154 |
| 2001/0043269 A1 | 11/2001 | Holloway | |
| 2002/0049979 A1 * | 4/2002 | White et al. ............. | 725/87 |
| 2004/0090996 A1 | 5/2004 | Wu et al. | |
| 2004/0133907 A1 | 7/2004 | Rodriguez et al. | |
| 2004/0136388 A1 | 7/2004 | Schaff | |
| 2005/0091311 A1 | 4/2005 | Lund et al. | |
| 2006/0104345 A1 | 5/2006 | Millar et al. | |
| 2007/0039030 A1 * | 2/2007 | Romanowich et al. ....... | 725/105 |
| 2007/0107029 A1 | 5/2007 | Monroe et al. | |

OTHER PUBLICATIONS

"911-NOW: A Network on Wheels for Emergency Response and Disaster Recovery Operations," David Abusch-Magder et al, Bell Labs Technical Journal, Special Issue: Wireless Network Technology Issue Edited by Joseph A. Tarallo and James S. Peterson; published by Wiley InterScience; vol. 11, Issue 4, pp. 113-133, Mar. 9, 2007.
International Search Report & Written Opinion dated Mar. 23, 2009 in International Patent Application PCT/US2008/010794, Lucent Technologies Inc., Applicant, 13 pages.

* cited by examiner

*Primary Examiner* — John Follansbee
*Assistant Examiner* — Alan Chou
(74) *Attorney, Agent, or Firm* — Wall & Tong, LLP

(57) ABSTRACT

The invention includes a method and apparatus for controlling video streams. A method includes monitoring for an event associated with one of a plurality of video camera controllers providing a plurality of video streams where each of the video streams has a first quality level, and, in response to detecting an event associated with one of the plurality of video camera controllers, propagating a control message toward the one of the video camera controllers for which the event is detected, where a control message adapted for requesting the one of the video camera controllers to switch from providing the video stream using the first quality level to providing the video stream using a second quality level. The first quality level may be a low level of quality and the second quality level may be a high level of quality.

22 Claims, 9 Drawing Sheets

METHOD AND APPARATUS FOR CONTROLLING VIDEO STREAMS

FIELD OF THE INVENTION

The invention relates to the field of communication networks and, more specifically, to wireless networks.

BACKGROUND OF THE INVENTION

In video monitoring systems, such as video surveillance systems, many different video streams may be streamed from many different video cameras to a central video monitoring system, where one or more users may monitor the video streams. In many such systems, however, where video streams are transmitted using data connections, limited bandwidth availability of the data connections may significantly limit the number of video streams that may be simultaneously supported. In wireless networks, this problem is exacerbated because wireless networks typically have even less bandwidth available than wired networks, further limiting the number of different video streams that may be simultaneously supported. In general, existing solutions that attempt to improve bandwidth availability for supporting streaming video only address the compression of the video streams being transmitted. Disadvantageously, however, such existing data compression solutions only provide limited improvements in the number of video streams that may be simultaneously supported by the system.

SUMMARY OF THE INVENTION

Various deficiencies in the prior art are addressed through the invention of a method and apparatus for controlling video streams. A method includes monitoring for an event associated with one of a plurality of video camera controllers providing a plurality of video streams where each of the video streams has a first quality level, and, in response to detecting an event associated with one of the plurality of video camera controllers, propagating a control message toward the one of the video camera controllers for which the event is detected, where the control message adapted for requesting the one of the video camera controllers to switch from providing the video stream using the first quality level to providing the video stream using a second quality level. The first quality level may be a low level of quality and the second quality level may be a high level of quality.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION OF THE INVENTION

The present invention enables a video control system to control the level of quality of video streams provided from video camera controllers from which video streams originate to a video user interface(s) at which video streams are displayed, thereby improving bandwidth availability in the communication network over which the videos are streamed. Using the present invention, each of the video streams is streamed over the communication network and presented at the video user interface as a low-quality video stream until an event is detected at the video control system, which triggers the video control system to request that one or more video camera controllers switch from providing low-quality video streams to providing high-quality video streams. Thus, by enabling one or more video stream that may be of interest to be streamed and presented as a high-quality video stream(s), while the other video streams are streamed and presented as low-quality video streams, the present invention significantly increases the number of video streams that may be supported by given bandwidth of a communication network.

Figure 1:
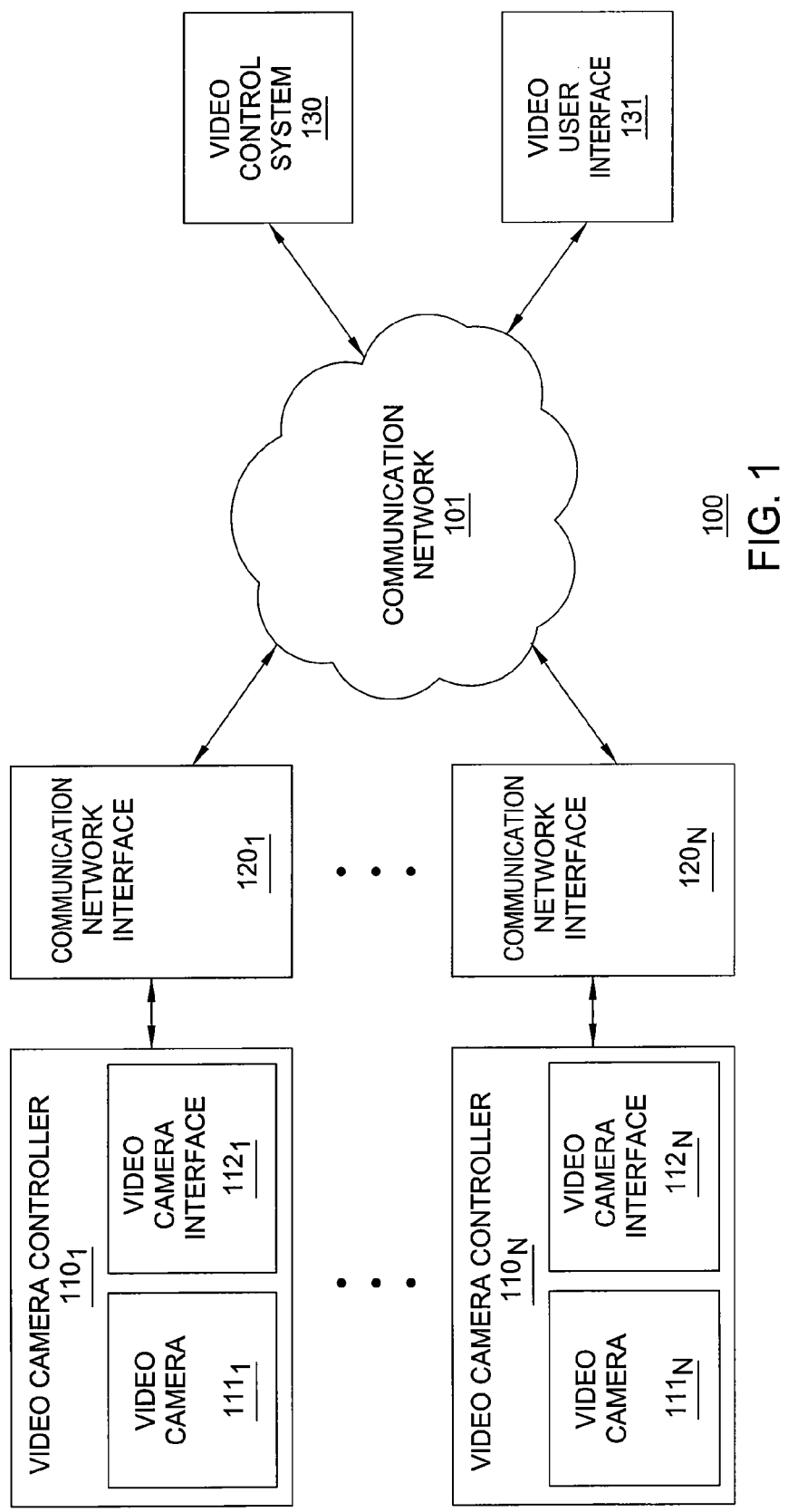
FIG. 1 depicts a high-level block diagram of a network architecture according to one embodiment of the present invention.

FIG. 1 depicts a high-level block diagram of a network architecture according to one embodiment of the present invention. Specifically, network architecture 100 of FIG. 1 includes a plurality of video camera controllers (VCCS) $110_1$-$110_N$ (collectively, VCCs 110), an associated plurality of communication network interfaces (CNIs) $120_1$-$120_N$ (collectively, CNIs 120), a communication network (CN) 101, a video control system (VCS) 130, and a video user interface (VUI) 131. As described herein, VCS 130 supports video stream quality control functions enabling VCS 130 to control the level of quality of video streams streamed from VCCs 110 to VUI 131 over CN 101 (via CNIs 120), thereby improving network resource usage and, thus, increasing the number of video streams capable of simultaneous support in the system.

The VCCs 110 capture video, generate associated video streams for conveying captured video, and propagate the generated video streams toward VUI 131. The VCCs 110 each support multiple levels of quality for generated video streams. In one embodiment, each VCC 110 supports, for a given video stream, a low level of quality (denoted as a low-quality video stream) and a high level of quality (denoted as a high-quality video stream). A low-quality video stream is a video stream having a low rate and/or a low resolution (relative to the high-quality video stream), or may be one or more still images. A high-quality video stream is a video stream having a high rate and/or a high resolution (relative to the low-quality video stream). Thus, since the terms "low-quality" and "high-quality" are relative terms, VCCs 110 may support any video stream quality levels. For example, VCCs 110 may support one or more intermediate video stream quality levels (in addition to the low and high quality levels).

The VCCs 110 provide the captured video streams to respective CNIs 120, which propagate the captured video streams to VUI 131 via CN 101. In one embodiment, each VCC 110 defaults to providing video to VUI 131 using a low-quality video stream (e.g., when a VCC 110 is activated and establishes a video session with the VUI 131, the VCC 110 initially provides the video as a low-quality video stream). A VCC 110 providing video to VUI 131 using a low-quality video stream, in response to a control message from VCS 130, switches to providing the video to VUI 131 using a high-quality video stream. A VCC 110 providing video to VUI 131 using a high-quality video stream, in response to a control message from VCS 130, switches to providing the video to VUI 131 using a low-quality video stream. The operation of VCCs 110 in switching between providing low-quality and high-quality video streams in response to control messages from VCS 130 may be better understood with respect to FIG. 3 and FIG. 4.

The VCCs $110_1$-$110_N$ include video cameras (VCs) $111_1$-$111_N$ (collectively, VCs 111), respectively. The VCs 111 capture video and generate associated video streams for conveying captured video. The VCCs $110_1$-$110_N$ include video camera interfaces (VCIs) $112_1$-$112_N$ (collectively, VCIs 112), respectively, by which VCs 111 communicate with CNIs 120, respectively. The VCIs 121 include any means of supporting communications between a video camera and a communication device providing an interface to a communication network (illustratively, CNIs 120 providing respective interfaces to CN 101). For example, VCIs 121 may include various combinations of hardware and software, e.g., video input/output ports, video drivers, and the like, as well as various combinations thereof.

In one embodiment, a VC 111 may support multiple video quality levels. In this embodiment, the associated VCI 112 may or may not be required to adapt the quality level of the video stream propagated toward VUI 131 (depending on whether the requested video stream quality level is supported by the VC 110). In one embodiment, a VC 111 may only support one video quality level. In this embodiment, the associated VCI 112 will be required to adapt the quality level of the video stream propagated toward VUI 131. For example, where a VC 111 of a given VCC 110 only supports a high quality level, if the VCC 110 is not requested by VCS 130 to provide a high-quality video stream, the VCI 112 may adapted the high-quality video stream provided by VC 110 in order to produce a low-quality version of the video stream that is provided to VUI 131.

The VCCs 110 provide video streams to VUI 131, and receive control messages from VCS 130 (for controlling the level of quality of video streams provided from VCCs 110 to VUI 131), using CNIs 120, respectively. The CNIs 120 support propagation of video streams (received from VCCs 110) to CN 101 for transmission to VUI 131. The CNIs 120 support communication of control messages (received from VCS 130 over CN 101) to VCCs 110 such that VCCs 110 may vary the quality levels of the respective video streams. Thus, the CNIs 120 include devices operable to facilitate communication between VCCs 110 and CN 101 (and, thus, VCS 130 and VUI 131). The CNIs 120 may also support communication of control message from VCCs 110 to VCS 130 and/or VCI 131.

Thus, CNIs may support any required communications associated with VCCs 110. The CNIs 122 include any means of supporting communications with a communication network. For example, CNIs 122 may include network interfaces to various different types of communication networks, including wireline communication networks and/or wireless communication networks. For example, CNIs 120 may include devices such as laptops, personal digital assistants (PDA), and the like. Although primarily depicted and described herein as separate devices, in one embodiment, one or more of the VCCs 110 may incorporate portions of the CNI functionality, i.e., such that separate CNIs 120 are not required in order to support communications for the associated VCCs 110.

The CN 101 is any network supporting communications between VCS 130 and VCCs 110 (via associated CNIs 120) for controlling video stream quality, between VCCs 110 and VUI 131 for streaming videos from VCCs 110 to VUI 131, and between VUI 131 and VCS 130 for enabling users of VUI 131 to control video streams from VCCs 110. Since communications may include video streams propagated from VCCs 110 to VUI 131, control messages propagated from VUI 131 to VCS 130, control messages propagated from VCS 130 to VCCs 110, and various other communications, CN 101 may be any network(s) operable for propagating video streams, control messages, and any other information associated with the present invention. In other words, CN 101 may include any configuration of wireline communications capabilities and/or wireless communications capabilities.

The VCS 130 is operable for detecting events which trigger control messages to be generated and transmitted to VCs 110 in order to modify the level of quality with which the VCs 110 provide video streams. The event may be detected by VCS 130 as a user request, from VUI 131, to receive the video as a high-quality video stream. The event may be detected by VCS 130 from VUI 131 based on processing of a low-quality video stream by the VUI 131. The event may be detected by VCS 130 by processing data received from one or more other devices associated with one of VCCs 110 (e.g., one or more monitoring devices, such as monitors, detectors, sensors, and the like). The event may be any other event which may trigger VCS 130 to request one (or more) of the VCCs 110 to switch from providing a video using a video stream having a first level of quality to providing the video using a video stream having a second level of quality.

The VUI 131 is operable for receiving video streams from VCCs 110 (via CNIs 120 and CN 101), and presenting the received video streams. The VUI 131 is operable for receiving and presenting videos conveyed by video streams having different levels of quality. For example, VUI 131 is operable for receiving and presenting a large number of low-quality video streams and, when applicable, one or more high-quality video streams. The VUI 131 is operable for generating control messages adapted for triggering VCS 130 to request that VCCs 110 modify the level of quality with which those VCs 110 provide video streams (e.g., either to increase or decrease the level of quality of the video stream). As described herein, two or more video stream quality levels may be supported by VCCs 110 and, thus, by VUI 131.

The VCS 130 includes components adapted for performing the various video stream control functions depicted and described herein as being performed by VCS 130. For example, VCS 130 may include processors, memory (e.g., for storing programs, applications, data, and the like, as well as various combinations thereof), control modules, transceivers, support circuits, and the like, as well as various combinations thereof. In one embodiment, for example, VCS 130 may be implemented using the architecture depicted and described herein with respect to FIG. 9. Although omitted for purposes of clarity, in one embodiment VCS 130 may support at least a portion of the functions of VUI 131.

The VUI 131 is any user system operable for performing the described functions. The VUI 131 includes one or more presentation devices adapted for presenting received video streams (e.g., displays, speakers, and the like), as well as one or more video presentation applications adapted for presenting a large number of low-quality video streams and, when applicable, one or more high-quality video streams. The VUI 131 includes one or more input devices for receiving input from one or more users (e.g., a touch screen, a keyboard, a mouse, and the like), thereby enabling users to configure and control various functions of VCS 130. The VUI 131 includes various components in support of the described functions (e.g., processors, memory (e.g., for storing programs, applications, data, and the like, as well as various combinations thereof), encoders, decoders, transceivers, support circuits, and the like, as well as various combinations thereof)

Although primarily depicted and described herein with respect to one VUI 131, multiple VUIs 131 may be deployed for receiving, presenting, and interacting with video streams from VCCs 110. In one embodiment, in which multiple VUIs 131 are deployed, the VUIs may be co-located (e.g., within a workcenter, security center, and the like), geographically distributed, and the like, as well as various combinations thereof. Although primarily depicted and described herein with respect to embodiments in which VUI 131 is not a part of VCS 130, in one embodiment VCS 130 may include one or more video user interfaces (either in place of VUI 131 or in addition to VUI 131). Thus, the present invention is not limited to the implemented depicted and described with respect to FIG. 1.

Figure 2:
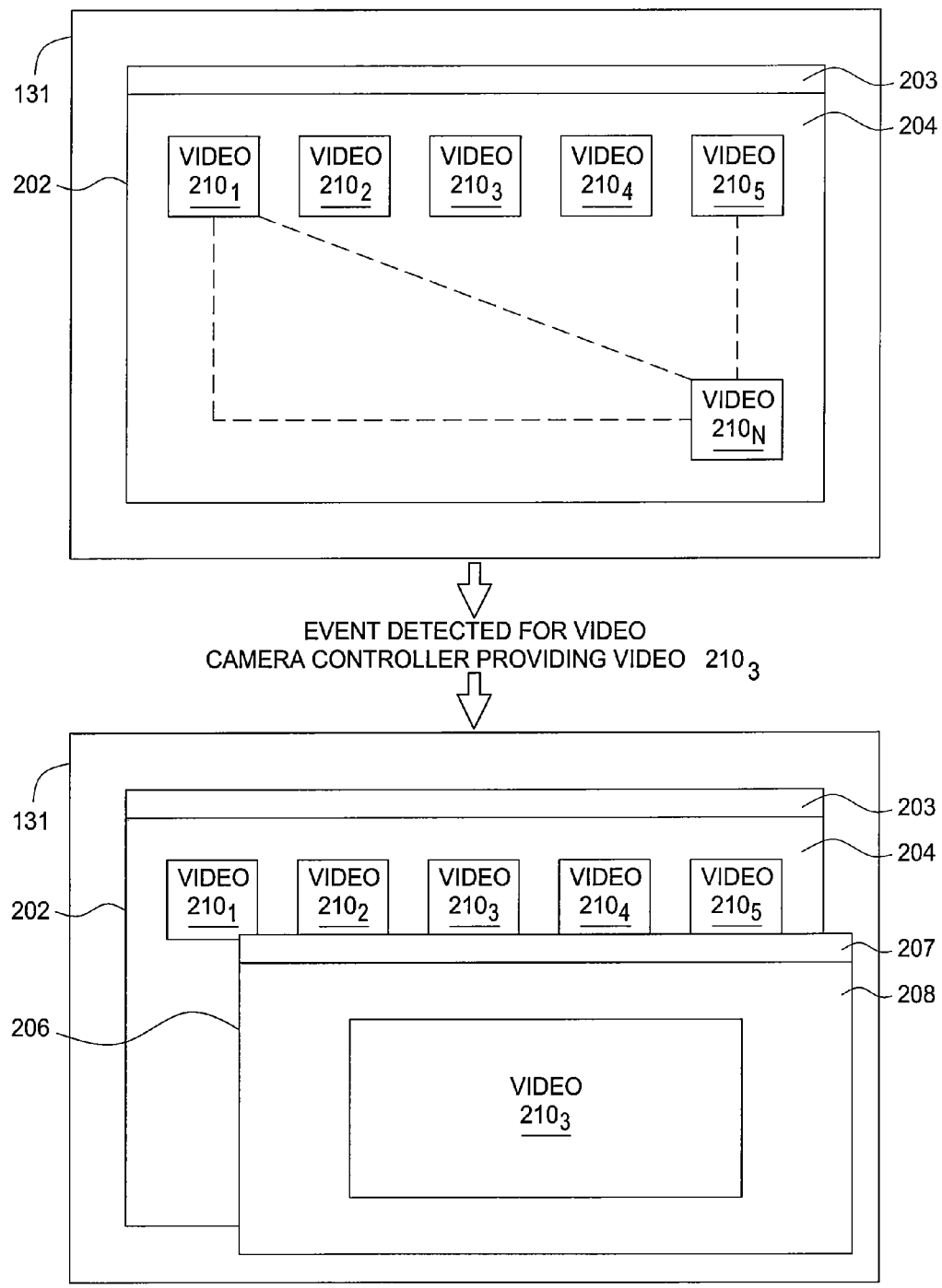
FIG. 2 depicts a video management application, according to one embodiment of the present invention, displayed on the video user interface of FIG. 1.

FIG. 2 depicts a video management application, according to one embodiment of the present invention, displayed on the video user interface of FIG. 1. As depicted in FIG. 2, VUI 131 presents a video management application window 202 before a detected event results in a high-quality video stream being received and presented (top of FIG. 2) and after a detected event results in a high-quality video stream being received and presented (bottom of FIG. 2). The video management application window 202 includes a menu region 203 and a video display region 204. The menu region 203 may include one or more dropdown menus (e.g., FILE, EDIT, and the like) by which the video management application may be controlled. The video display region 204 displays videos received from video cameras.

As depicted in FIG. 2, before detection of an event results in a high-quality video stream being received from a video camera controller, low-quality video streams are received from video camera controllers and presented in the video display region 204. The low-quality video streams are presented in a low-quality format. For example, the low-quality video streams may be presented as video thumbnails, such that numerous different streaming videos may be viewed on presentation device 200 simultaneously. Specifically, multiple videos $210_1$-$210_N$ (collectively, videos 210) are presented in video display region 204 in a low-quality format. For example, videos 210 may be presented as video thumbnails, which may be selectable via a user interaction device. The videos 210 (i.e., the displayed thumbnails) may be manually selected by a user (e.g., such that a user of the video control system can manually select one or more videos to review in high-quality format rather than low-quality format), or may be selected automatically in response to one or more detected events.

As depicted in FIG. 2, after detection of an event results in a high-quality video stream being received from a selected video camera controller, the low-quality video streams continue to be presented in a low-quality format and, additionally, the high-quality video stream is presented in a high-quality format. The high-quality video stream may be presented in any manner. For example, the high-quality video stream may be presented in a region of an existing window in which the low-quality video streams are being presented, in an existing window in which one or more other previously requested high-quality video streams are presented, in a new window that is opened to display that high-quality video stream, and the like, as well as various combinations thereof. The present invention is not limited by the manner in which the low-quality and high-quality video streams may be displayed.

As depicted in FIG. 2, an event is detected for the video camera controller providing video $210_3$. Upon detecting the event for the video camera controller providing video $210_3$, the video camera controller providing video $210_3$ as a low-quality video stream is requested (i.e., by the video management application, using a control message), to provide video $210_3$ as a high-quality video stream, and a new video management application window 206 is launched to present the high-quality version of video $210_3$. The new video management application window 206 includes a menu region 207 and a video display region 208. The menu region 207 may include dropdown menus for controlling new video management application window 206. The video display region 208 displays a high-quality version of video $210_3$. As depicted in FIG. 2, the new video management application window 206 may overlay at least a portion of the original video management application window 202.

Thus, after the detected event, video $210_3$ is presented as a high-quality video in the new video management application window 206, while videos of the remaining low-quality video streams (i.e., videos $210_1$, $210_2$, $210_4$, $210_5$ through $210_N$) continue to be presented as low-quality video thumbnails in the original video management application window 202. The low-quality version of video $210_3$ may continue to be presented as a video thumbnail (as depicted in FIG. 2) or, alternatively, may no longer be presented in the original video management application window 202 as long as the high-quality version of video $210_3$ continues to be presented. In other words, the video management application windows depicted and described with respect to FIG. 2 merely provide one example of how low-quality and high-quality video streams may be displayed.

The low-quality video streams and high-quality video streams may be presented in various other ways. In one embodiment, for example, the low-quality video streams may continue to be presented in one region of the original video presentation window (e.g., as a window of thumbnails) while the high-quality video stream(s) is presented in separate region of the video presentation window. In one embodiment, for example, the low-quality video streams may continue to be presented in an original video presentation window, and the high-quality video stream is presented in a new video presentation window. In one embodiment, for example, the video presentation application may include picture-in-picture capabilities, such that some or all of the low-quality video streams may continue to be presented by overlaying the low-quality video streams on a portion of the presentation of the high-quality video stream(s).

As described herein, the present invention enables numerous videos to be presented simultaneously in low-quality format until an event triggers one or more of the videos to be switched from being presented in low-quality format to being presented in high-quality format. Thus, the present invention conserves network resources by only generating, propagating, and presenting a high-quality video stream when that video stream may be of interest (as determined by detection of an event). Furthermore, by conserving network resources, the present invention substantially increases the number of video streams which may be simultaneously supported (since all video streams are provided as low-quality video streams until one or more of the video streams need to be provided as high-quality video streams in order to be reviewed in high-quality format). For example, by providing low-quality video streams as a default (and only streaming high-quality video streams in response to events), the present invention enables the number of supported video streams to be increased by a factor of 100, or even more.

Figure 3:
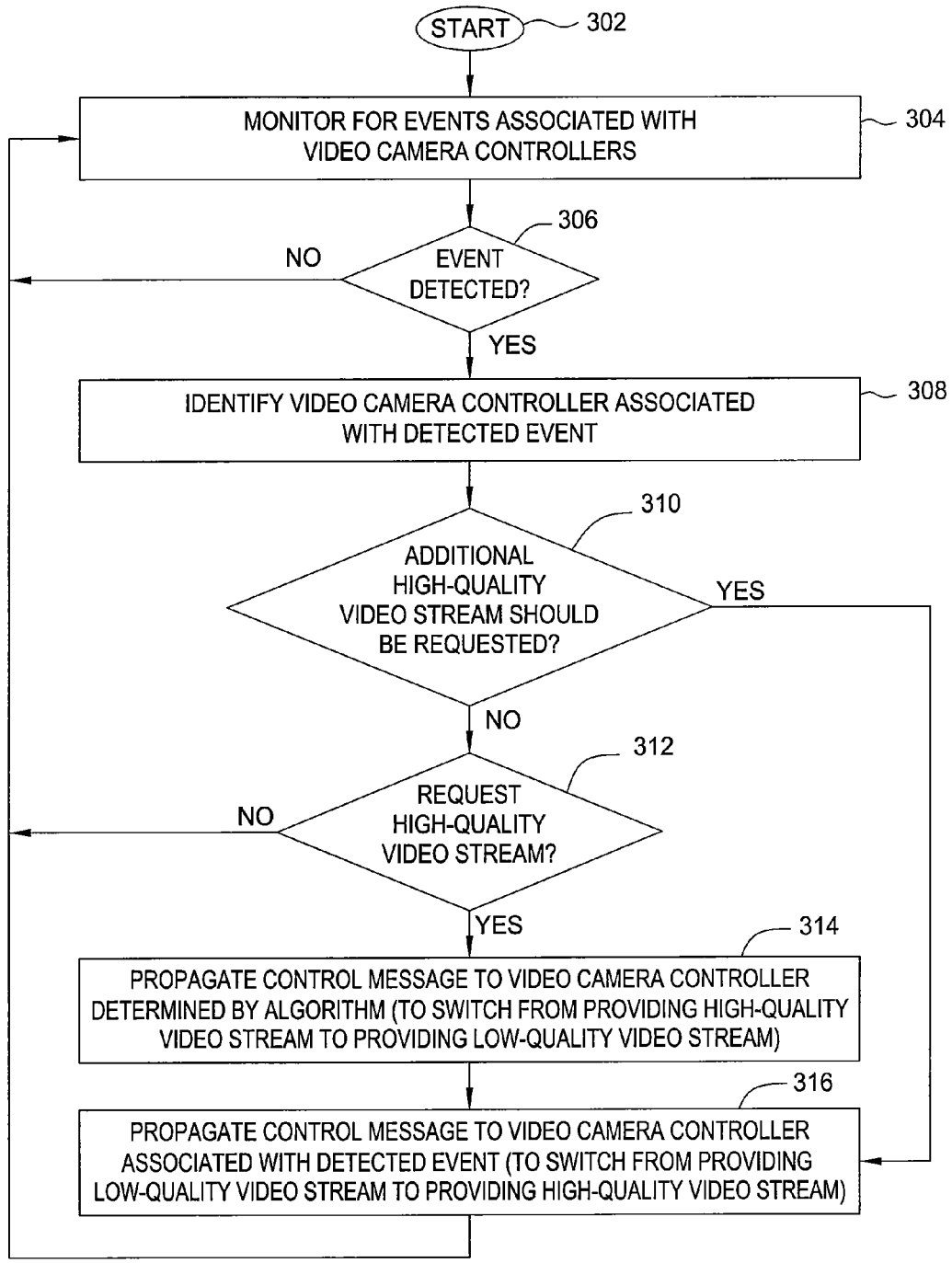
FIG. 3 depicts a method according to one embodiment of the present invention.

FIG. 3 depicts a method according to one embodiment of the present invention. Specifically, method 300 of FIG. 3 includes a method for generating and transmitting a control message in response to a detected event, where the control message is adapted to request a video camera controller to switch from providing a video as a low-quality video stream to providing the video as a high-quality video stream. Although depicted and described as being performed serially, at least a portion of the steps of method 300 of FIG. 3 may be performed contemporaneously, or in a different order than depicted and described with respect to FIG. 3. The method 300 begins at step 302 and proceeds to step 304.

At step 304, the video control system monitors for events associated with video camera controllers providing respective video streams to a video user interface(s). As the video control system monitors for events associated with video camera controllers, one or more events may have already been detected by the video control system. Thus, as the video control system monitors for events associated with the video camera controllers, the video user interface may be receiving and presenting all video streams as low-quality video streams or may be receiving and presenting both low-quality video streams and high-quality video streams. As described herein, received low-quality video streams may be presented as respective video thumbnails, thereby allowing an operator of the video control system to simultaneously view many videos.

At step 306, a determination is made as to whether an event is detected for one of the video camera controllers. If an event is not detected, method 300 returns to step 304 (i.e., the video control system continues to monitor for events associated with video camera controllers, and the video user interface continues to receive and present low-quality video streams, and possibly also high-quality video streams, from video camera controllers). If an event is detected, method 300 proceeds to step 308. Although primarily depicted and described with respect to an embodiment in which one event is detected for one video camera controller, in some situations N events may be detected for N video camera controllers (e.g., one event may be detected that is associated with multiple video camera controllers, multiple events may be detected that are associated with one video camera controller, or multiple events may be detected that are associated with multiple video camera controllers without having a 1:1 correlation between detected events and video camera controllers).

As described herein, the detected event that triggers a request for an associated video camera controller to switch from providing a low-quality video stream to providing a high-quality video stream may be any event. The event may be detected as a user request to receive the video as a high-quality video stream. The event may be detected by processing the low-quality video stream received from the video camera controller (e.g., the content changes). The event may be detected by processing data received from one or more other devices associated with the video camera controller (e.g., one or more monitoring devices, such as monitors, detectors, sensors, and the like). The event may be any other event which may trigger a request for a video camera controller to switch from providing a low-quality video stream to providing a high-quality video stream.

At step 308, the video camera controller associated with the detected event is identified. As stated above, for purposes of clarity in describing the present invention, the present invention is primarily depicted and described herein within the context of an embodiment in which one event is detected for one video camera controller. The video camera controller associated with a detected event may be identified in any manner, which may depend various factors, such as on the type of event detected.

In one embodiment, for example, where the event is manual selection of the video stream by a user via a video user interface, or processing of the content of a received low-quality video stream by the video user interface, the video camera controller may be identified using information included in one or more control messages received at the video control system from the video user interface.

In one embodiment, for example, where the event is detected by processing data received from one or more monitoring devices, the video camera controller may be identified in any of a number of way. For example, the video camera controller may be identified using information included in data received from the monitoring device(s), using an association of the monitoring device(s) to a video camera controller (e.g., where the association may be stored locally by the video control system, retrieved by the video control system, and the like), identifying a video camera controller nearest the monitoring device(s) (e.g., based on geographic location information associated with the video camera controllers and monitoring devices), and the like, as well as various combinations thereof.

Although primarily depicted and described with respect to identifying one video camera controller in response to a detected event, in some embodiments one or more video camera controllers may be identified in response to one or more detected events. For example, if multiple video camera controllers are associated with one detected event, multiple video camera controllers may be identified in response to detection of a single event, and, similarly, if multiple events are detected for a single video camera controller, only one video camera controller may be identified even though multiple events are detected. As one example, where the event is manual selection by a user, multiple video camera controllers may be identified in response to selection of multiple video streams by the user. As another example, where the event is detected by processing data received from one or more monitoring devices, multiple video camera controllers may be identified as being associated with the monitoring device(s) (e.g., where there are multiple video camera controllers in the geographical vicinity of the monitoring device(s) with which the detected event is associated).

At step 310, a determination is made as to whether or not an additional high-quality video stream should be requested. If an additional high-quality video stream should be requested, method 300 proceeds to step 316, at which point the video control system propagates a control message toward the video camera controller associated with the detected event to request that the video camera controller begin providing a high-quality video stream. If an additional high-quality video stream should not be requested, method 300 proceeds to step 312, at which point the video control system determines whether or not to request a high-quality video stream from the video camera controller associated with the detected event (i.e., the video control system may perform an evaluation in order to determine whether or not to replace an existing high-quality video stream with a high-quality video stream from the video camera controller for which the most recent event was detected).

In one embodiment, the video control system may determine whether the detected event is associated with a video camera controller from which a high-quality video stream is already being received. In this embodiment, if the detected event is associated with a video camera controller from which a high-quality video stream is already being received, the video control system does not need to transmit a control message because the video control system is already receiving a high-quality version of the video from that video camera controller; however, if the detected event is associated with a video camera controller other than the video camera controller from which a high-quality video stream is being received, the video control system may need to perform some additional evaluation in order to determine whether or not to transmit a control message to the video camera controller associated with the detected event.

In one embodiment, in which only one high-quality video steam may be received and presented at a time (e.g., due to capacity constraints, because the system is configured in this manner, and the like), upon detecting an event and determining that the detected event is associated with a video camera controller that is different than the video camera controller from which a high-quality video stream is currently being received, the video control system will proceed to step 312, at which point the video control system determines whether or not to request a high-quality video stream from the video camera controller associated with the detected event In one embodiment, in which multiple high-quality video steams may be received and presented at a time, upon detecting an event and determining that the detected event is associated with a video camera controller that is different than the video camera controller from which any high-quality video stream is currently being received, the video control system determines whether or not an additional high-quality video stream can currently be supported. The determination as to whether or not an additional high-quality video stream can be supported may be performed in any manner for evaluating whether or not an additional high-quality video stream can be supported.

In one embodiment, for example, the determination as to whether or not an additional high-quality video stream can be supported may be a determination as to whether or not there is sufficient network capacity available to support an additional high-quality video stream. In one such embodiment, the network capacity that is evaluated may be the total network capacity, or a portion of the total network capacity that is designated to carry video streams intended for the video control system. In another embodiment, for example, the determination as to whether or not an additional high-quality video stream can be supported may be a determination as to whether or not the video control system can support an additional high-quality video stream. The determination as to whether or not an additional high-quality video stream can be supported may be performed using other types of evaluations.

In such embodiments, if an additional high-quality video stream can be supported, method 300 proceeds to step 316, at which point the video control system propagates a control message toward the video camera controller associated with the detected event to request that the video camera controller begin providing a high-quality video stream. In such embodiments, if an additional high-quality video stream cannot be supported, method 300 proceeds to steps 312 and 314, at which point the video control system may make a determination as to whether or not one of the existing high-quality video streams should be switched back to a low-quality video stream such that a high-quality video stream may be received from the video camera controller associated with the detected event.

At step 312, a determination is made as to whether or not to request a high-quality video stream from the video camera controller associated with the detected event. Since this determination is performed in response to a determination that an additional high-quality video stream should not be requested (i.e., that the number of high-quality video streams currently being propagated to the video user interface should remain unchanged), the determination as to whether or not to request a high-quality video stream from the video camera controller associated with the detected event may be alternatively considered to be a determination as to whether one of the existing high-quality video streams should be switched back to a low-quality video stream in order to enable the video camera controller associated with the detected event to provide a high-quality video stream. The determination as to whether or not one of the existing high-quality video streams should be switched back to a low-quality video stream may be performed in any manner.

In one embodiment, the video control system may automatically select one of the video camera controllers currently providing a high-quality video stream to switch from providing the high-quality video stream to providing a low-quality video stream (i.e., one of the existing high-quality video streams is always replaced with a new high-quality video stream from the video camera controller for which the event is detected). In one such embodiment, the video control system may automatically select one of the video camera controllers to switch from providing the high-quality video stream to providing a low-quality video stream using one or more comparisons (e.g., comparing one or more parameters associated with each of the high-quality video streams being provided to the video control system in order to select the high-quality video stream that is switched to a low-quality video stream).

In one embodiment, the video control system does not automatically select one of the video camera controllers currently providing a high-quality video stream to switch from providing the high-quality video stream to providing a low-quality video stream. In one such embodiment, the determination as to whether or not one of the existing high-quality video streams should be switched back to a low-quality video stream may be performed using one or more comparisons (e.g., comparing one or more parameters associated with the low-quality video stream for which the event was detected to one or more corresponding parameters associated with each of the high-quality video streams currently being provided to the video control system).

In such embodiments, as described above, the determination of one of the existing high-quality video streams that will be switched back to a low-quality video stream or the determination as to whether or not one of the existing high-quality video streams should be switched back to a low-quality video stream may be performed using various comparisons of different parameters and information.

The comparison may be a comparison that is based on the order in which the events (which triggered the respective video camera controllers providing the high-quality video streams to switch from low-quality video streams to high-quality video streams) were detected. As one example, where one of the high-quality video streams is automatically switched to a low-quality video stream, the existing high-quality video stream provided in response to the oldest event may be determined to be the high-quality video stream to be switched to a low-quality video stream. Similarly, as one example, where one of the high-quality video streams is not automatically switched to a low-quality video stream, the existing high-quality video stream provided in response to the oldest event may be determined to be the high-quality video stream to be switched to a low-quality video stream.

The comparison may be a comparison that is based on the priority of the events which triggered the respective video camera controllers providing the high-quality video streams to switch from providing low-quality video streams to providing the high-quality video streams. As one example, where one of the high-quality video streams is automatically switched to a low-quality video stream, the existing high-quality video stream provided in response to the event having the lowest priority may be determined to be the high-quality video stream to be switched to a low-quality video stream. As one example, where one of the high-quality video streams is not automatically switched to a low-quality video stream, the video camera controller associated with the detected event may only be requested to provide a high-quality video stream where the priority of that detected event is greater than the priority of at least one of the events which triggered one of the existing high-quality video streams to be provided (i.e., the existing high-quality video stream provided in response to the lowest priority event is replaced with a high-quality video stream from the video camera controller associated with the most recently detected event).

The comparison may be based on various other parameters and/or information. For example, the comparison may be based on whether or not a user request(s) triggered any of the high-quality video streams to be provided (e.g., where user requests for high-quality video streams may be preferred over high-quality video streams not requested by a user or vice versa), based on priorities assigned to the respective video camera controllers, based on one or more characteristics of the content of the video streams, and the like. Furthermore, although the different parameters and information on which such comparisons may be based have primarily been described as being evaluated individually, various combinations of such parameters and information may be used in order to determine whether or not one of the existing high-quality video streams should be switched back to a low-quality video stream.

As depicted in FIG. 3, if the video control system determines that the existing high-quality video streams should continue to be provided (rather than requesting a high-quality video stream from the video camera controller associated with the detected event), the video control system does not have to perform any additional processing or transmit any control messages; rather, the video control system merely ignores the detected event. In this case, since a determination is made not to request a high-quality video stream from the video camera controller associated with the detected event, method 300 returns from step 312 to step 304, at which point the video control system continues to monitor for other detected events. As depicted in FIG. 3, if the video control system determines that one of the existing high-quality video streams should be switched back to a low-quality video stream such that a high-quality video stream may be received from the video camera controller associated with the detected event, the video control system proceeds to steps 314 and 316, at which point the video control system propagates control messages to video camera controller adapted for changing the quality levels of video streams provided by the video camera controllers.

At step 314, the video control system propagates a control message to a video camera controller determined using one or more of the comparisons described hereinabove. The control message is adapted to request the selected video camera controller to switch from providing a high-quality video stream to providing a low-quality video stream (i.e., to enable a high-quality video stream to be provided from the video camera controller associated with the detected event). The video camera controller may be determined in any manner. In one embodiment, the video camera controller is determined based on the evaluation associated with the determination as to whether or not to request a high-quality video stream from the video camera controller associated with the detected event. The control message may be generated in any manner. The control message may be formatted in any manner. The control message may be propagated in any manner.

As depicted in FIG. 3, from step 314 (as well as from step 310, when a determination is made that an additional high-quality video stream can be supported), method 300 proceeds to step 316. In other words, where method 300 proceeds to step 312 and a determination is made to request a high-quality video stream from the video camera controller associated with the detected event, the video control system will transmit two control messages: (1) a control message to one of the video camera controllers currently providing a high-quality video stream to request that the video camera controller switch from providing a high-quality video stream to providing a low-quality video stream (step 314); and (2) a control message to the video camera controller identified as being associated with the detected event to request that the identified video camera controller switch from providing a low-quality video stream to providing a high-quality video stream (step 316).

At step 316, the video control system propagates a control message to the video camera controller associated with the detected event. The control message is adapted to request the video camera controller associated with the detected event to switch from providing a low-quality video stream to providing a high-quality video stream. The control message may be generated in any manner. The control message may be formatted in any manner. The control message may be propagated in any manner. From step 316, method 300 returns to step 304, at which point the video control system continues to monitor for other detected events. Although depicted as looping continuously, method 300 may be terminated (e.g., where a video control program being executed by the video control system is terminated).

Although primarily depicted and described herein with respect to an embodiment in which identification of the video camera controller associated with a detected event (i.e., step 308) is performed after an event is detected, since one or more factors may result in the detected event being unable to be served (and, thus, being ignored, as depicted and described with respect to steps 310 and 312), in other embodiments the step of identifying the video camera controller associated with a detected event may be omitted, or may be performed after step 310 but prior to step 316 when the control message is propagated to the identified video camera controller associated with the detected event.

For example, where the determination, as to whether or not to accept a high-quality video stream from the video camera controller associated with the newly detected event, is not dependent on the identity of the video camera controller with which the detected event is associated, identification of the video camera controller associated with a detected event (i.e., step 308) may be performed before or after steps 310-314 (e.g., as step 308, or moved to being performed prior to step 316 when the control message is propagated to an identified video camera controller associated with the detected event).

By contrast, where the determination, as to whether or not to accept a high-quality video stream from the video camera controller associated with the newly detected event, is dependent on the identity of the video camera controller with which the detected event is associated, identification of the video camera controller associated with a detected event must be performed before steps 310-314.

Although primarily depicted and described herein with respect to events that trigger a control message adapted to request an associated video camera controller to switch from providing a low-quality video stream to providing a high-quality video stream, in one embodiment the video control system may be adapted to monitor for one or more events that trigger a control message adapted to request an associated video camera controller to switch from providing a high-quality video stream to providing a low-quality video stream. In such embodiments, the events that trigger a control message adapted to request an associated video camera controller to switch from providing a high-quality video stream to providing a low-quality video stream may include may different types of events.

For example, such events may include: (1) a determination that one of the existing high-quality video streams should be switched back to a low-quality video stream in order to enable the video camera controller associated with a detected event to provide a high-quality video stream; (2) a user request to switch a video camera controller from providing a high-quality video stream to providing a low-quality video stream; (3) an event detected by processing the high-quality video stream received from the video camera controller (e.g., the content changes); (4) an event detected by processing data received from one or more other devices associated with the video camera controller (e.g., one or more monitoring devices, such as monitors, detectors, sensors, and the like); (5) and the like, as well as various combinations thereof. The event may be any other event which may trigger a request for a video camera controller to switch from providing a high-quality video stream to providing a low-quality video stream.

Therefore, using the video control capabilities of the present invention, any combination of low-quality video streams and high-quality video streams may be propagated from respective video camera controllers to the video user interface and presented on the video user interface. The low-quality video streams and the one or more high-quality video streams may be presented in any manner for presenting multiple video streams. As depicted and described herein, the low-quality video streams and the one or more high-quality video streams may be presented within one window, using separate windows (e.g., one window for low-quality video streams and one or more additional windows for one or more high-quality video streams), picture-in-picture capabilities, and the like, as well as various combinations thereof. The operation of a video camera controller in switching between providing video streams having different levels of quality may be better understood with respect to FIG. 4.

Figure 4:
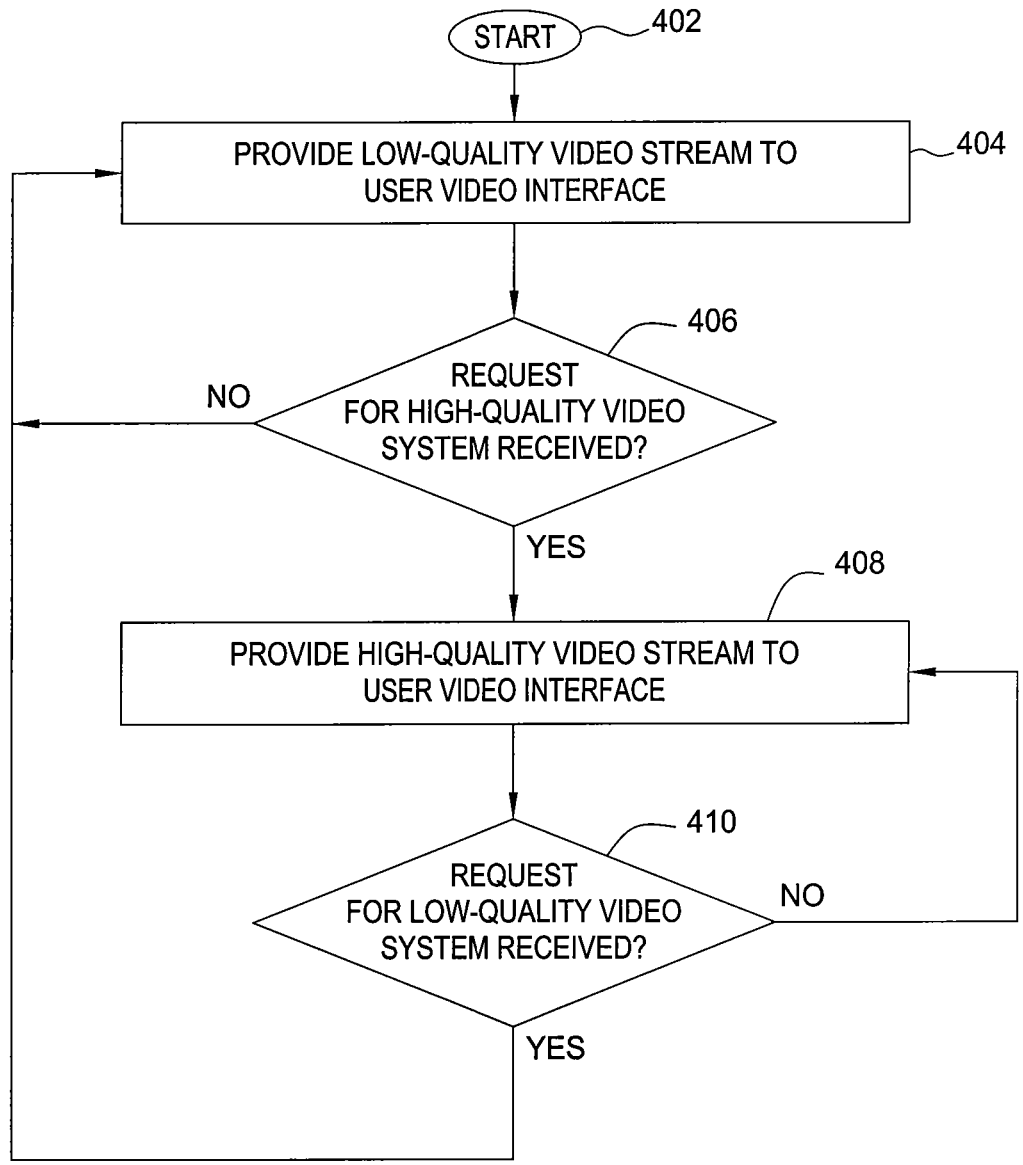
FIG. 4 depicts a method according to one embodiment of the present invention.

FIG. 4 depicts a method according to one embodiment of the present invention. Specifically, method 400 of FIG. 4 includes a method for switching between providing a low-quality video stream and a high-quality video stream in response to a control signal. Although depicted and described with respect to low-quality and high-quality video streams, any number of different video stream quality levels may be supported. Although depicted and described as being performed serially, at least a portion of the steps of method 400 of FIG. 4 may be performed contemporaneously, or in a different order than depicted and described with respect to FIG. 4. The method 400 begins at step 402 and proceeds to step 404.

At step 404, a low-quality video stream is provided from the video camera controller to the video user interface. The low-quality video stream is provided by the video camera controller using a low resolution and/or a low rate (or, optionally, as one or more still pictures). At step 406, a determination is made as to whether a request for a high-quality video stream is received (i.e., whether a control message is received at the video camera controller from the video control system). If a request for a high-quality video stream is not received, method 400 returns to step 404 (i.e., the video camera controller continues to provide a low-quality video stream until a control message, requesting a high-quality video stream, is received). If a request for a high-quality video stream is received, method 400 proceeds to step 408.

At step 408, a high-quality video stream is provided from the video camera controller to the video user interface. The high-quality video stream is provided by the video camera controller using a high resolution and/or a high rate. At step 410, a determination is made as to whether a request for a low-quality video stream is received (i.e., whether a control message is received at the video camera controller from the video control system). If a request for a low-quality video stream is not received, method 400 returns to step 408 (i.e., the video camera controller continues to provide a high-quality video stream until a control message, requesting a low-quality video stream, is received). If a request for a low-quality video stream is received, method 400 returns to step 404.

Although omitted for purposes of clarity, the video camera controller may provide the video stream (either at a low level of quality or at a high level of quality) in any manner for streaming video. For example, the video may be streamed from the video camera controller to the video control system using any combination of wireless and/or wireline connections/networks, protocols, and the like, as well as various combinations thereof. In one embodiment, for example, the video camera controller may stream video using the Real-time Transfer Protocol (RTP), or any other protocol adapted for streaming video. The present invention is not intended to be limited by communications networks, protocols, and the like that are used to stream video from the video camera controllers to the video control system.

As described herein, the video stream quality control functions of the present invention may be utilized for various applications. For example, the present invention may be implemented in video security systems. In one such example, security personnel monitor video feeds from one geographic area, such as a building or campus area, with numerous video cameras deployed to provide security (e.g., in hotels, casinos, apartment buildings, office buildings, college campuses, and the like). In another such example, security personnel monitor video feeds from video cameras deployed at different geographic locations, such as homes, businesses, and the like. Therefore, the present invention is useful in any situation in which multiple video streams need to be monitored.

As an additional example of an application of the present invention, the present invention may be implemented to provide video stream quality control functions in an emergency network. For example, the present invention may be implemented as a part of a rapidly deployable wireless network (denoted herein as a 911 network on wheels, i.e., a 911-NOW network). In order to better understand the operation of the present invention, the present invention is further depicted and described with respect to one of the many applications in which the present invention may be utilized; namely, with present invention is depicted and described with respect to being implemented in an emergency network, such as a 911-NOW network.

A 911-NOW network is formed by placing a 911-NOW node(s) on a mobile platform(s) such that when the mobile platform(s) is dispatched to a network site, the 911-NOW node(s) provides a wireless communication network. As described herein, one or more 911-NOW nodes may be deployed to form a wireless network. The 911-NOW network may be a standalone wireless network independent of existing network infrastructure or an integrated wireless network that utilizes existing network infrastructure. In order to better understand this application of the present invention, additional details of 911-NOW-based networks, including 911-NOW nodes from which 911-NOW networks may be formed, are provided with respect to FIGS. 5-8.

Figure 5:
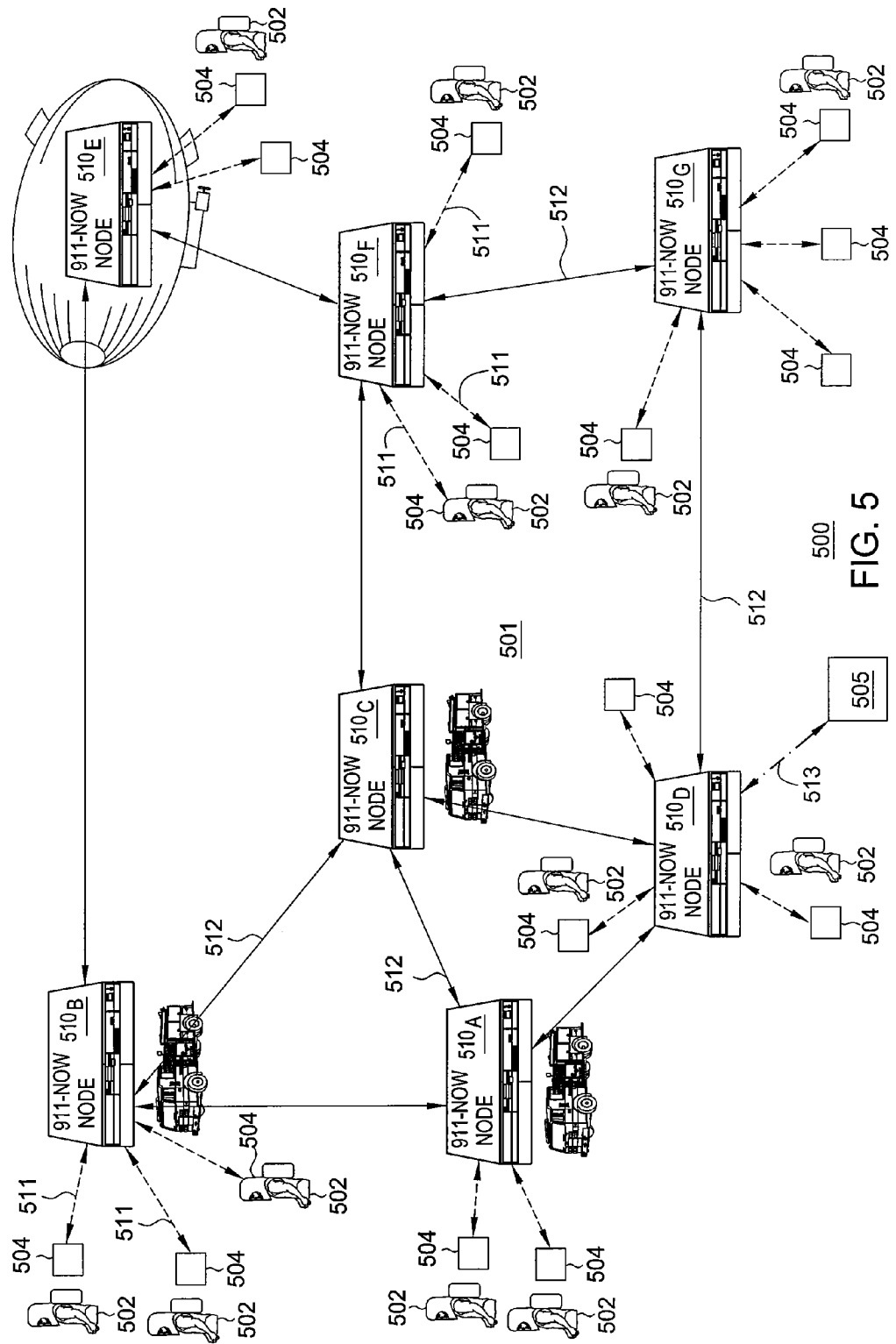
FIG. 5 depicts a standalone 911-NOW communication network architecture that is independent of any existing network infrastructure.

FIG. 5 depicts a standalone 911-NOW communication network architecture that is independent of any existing network infrastructure. Specifically, standalone 911-NOW communication network architecture 500 includes a plurality of 911-NOW nodes $510_A$-$510_G$ (collectively, 911-NOW nodes 510) supporting wireless communications at an emergency site 501. The standalone 911-NOW communication network architecture 500 provides a fully-functional network since each of the 911-NOW nodes 510 supports radio access network (RAN) functions, core networking functions, and services. As depicted in FIG. 5, each of the 911-NOW nodes 510 is placed or mounted on a mobile platform and transported to emergency site 501. The 911-NOW nodes 510 form a wireless network at emergency site 501.

The emergency site 501 may be any location at which a wireless network is required. The emergency site 501 may be a localized site, a collection of localized sites, a widespread site, a collection of widespread sites, and the like, as well as various combinations thereof. For example, emergency site 501 may be a single location, multiple locations within a town or city, or even span one or more counties, states, countries, continents, and the like. The 911-NOW network is not limited by the scope of the emergency site. The emergency site 501 may be associated with any type of emergency. For example, emergency site 501 may be associated with a natural disaster (e.g., a flood, a hurricane, a tornado, and the like), a manmade disaster (e.g., a chemical spill, a terrorist attack, and the like), and the like, as well as various combinations thereof.

As depicted in FIG. 5, emergency personnel (denoted herein as users 502 of the 911-NOW network 500) have responded to the emergency. The users 502 are performing various different functions at different areas of emergency site 501. For example, the users may be containing the disaster, participating in evacuation operations, participating in search and rescue operations, and the like, as well as various combinations thereof. The users 502 use equipment in responding to the emergency, including equipment capable of receiving and sending information wirelessly (denoted herein as wireless user devices 504 of users 502). The wireless user devices 504 include communication equipment, and may include various other types of emergency equipment (depending on the type of emergency, severity of the emergency, logistics of the emergency site, and various other factors).

For example, wireless user devices 504 may include wireless devices carried by emergency personnel for communicating with other emergency personnel, receiving information for use in responding at the emergency site, collecting information at the emergency site, monitoring conditions at the emergency site, and the like, as well as various combinations thereof. For example, wireless user devices 504 may include devices such as walkie-talkies, wireless headsets, cell phones, personal digital assistants (PDAs), laptops, and the like, as well as various combinations thereof. The wireless user devices 504 may include various other equipment, such as monitors (e.g., for monitoring breathing, pulse, and other characteristics; for monitoring temperature, precipitation, and other environmental characteristics; and the like), sensors (e.g., for detecting air-quality changes, presence of chemical or biological agents, radiation levels, and the like), and various other equipment.

As depicted in FIG. 5, a 911-NOW-based network is established at the emergency site 501 by deploying 911-NOW nodes 510 (illustratively, 911-NOW nodes $510_A$-$510_G$) to emergency site 501. The 911-NOW nodes 510 may be deployed using mobile platforms. The 911-NOW nodes 510 may be deployed using standalone mobile platforms. For example, 911-NOW nodes 510 may be placed in backpacks, suitcases, and like mobile cases which may be carried by individuals. The 911-NOW nodes 510 may be deployed using mobile vehicles, including land-based vehicles, sea-based vehicles, and/or air-based vehicles. For example, 911-NOW nodes may be placed (and/or mounted) on police cars, swat trucks, fire engines, ambulances, humvees, boats, helicopters, blimps, airplanes, unmanned drones, satellites, and the like, as well as various combinations thereof. The 911-NOW nodes 510 may be deployed using various other mobile platforms.

As depicted in FIG. 5, 911-NOW node $510_A$ is deployed using a fire engine, 911-NOW node $510_B$ is deployed using a fire engine, 911-NOW node $510_C$ is deployed using a fire engine, 911-NOW node $510_D$ is deployed as a standalone node, 911-NOW node $510_E$ is deployed using a blimp, 911-NOW node $510_F$ is deployed as a standalone node, and 911-NOW node $510_G$ is deployed using a fire engine. The inherent mobility of 911-NOW nodes 510 enables quick and flexible deployment of a wireless network as needed (e.g., when, where, and how the wireless network is needed), thereby providing scalable capacity and coverage on-demand as required by the emergency personnel. Since each 911-NOW node 510 supports RAN functions, core networking functions, and various services, deployment of even one 911-NOW node produces a fully-functional wireless network.

As depicted in FIG. 5, the 911-NOW nodes 510 support wireless communications for wireless user devices 504 (denoted herein as wireless access communications). The wireless access communications include wireless communications between a 911-NOW node 510 and wireless user devices served by that 911-NOW node 510. A 911-NOW node 510 includes one or more wireless access interfaces supporting wireless communications for wireless user devices 504 using respective wireless access connections 511 established between wireless user devices 504 and 911-NOW nodes 510. The 911-NOW nodes 510 further support mobility of user devices 504 at emergency site 501 such that, as users 502 move around emergency site 501, communication sessions between wireless user devices 504 of those users 502 and 911-NOW nodes 510 are seamlessly transferred between 911-NOW nodes 510.

As depicted in FIG. 5, the 911-NOW nodes 510 support wireless communications between 911-NOW nodes 510 (denoted herein as wireless mesh communications). The wireless mesh communications include wireless communications between 911-NOW nodes, including information transported between wireless user devices 504, control information exchanged between 911-NOW nodes 510, and the like, as well as various combinations thereof. A 911-NOW node 510 includes one or more wireless mesh interfaces supporting wireless communications with one or more other 911-NOW nodes 510. The wireless mesh communications between 911-NOW nodes 510 are supported using wireless mesh connections 512 established between 911-NOW nodes 510.

As depicted in FIG. 5, the following pairs of 911-NOW nodes 510 communicate using respective wireless mesh connections 512: 911-NOW nodes $510_A$ and $510_B$, 911-NOW nodes $510_A$ and $510_C$, 911-NOW nodes $510_A$ and $510_D$, 911-NOW nodes $510_B$ and $510_C$, 911-NOW nodes $510_C$ and $510_D$, 911-NOW nodes $510_B$ and $510_E$, 911-NOW nodes $510_C$ and $510_F$, 911-NOW nodes $510_D$ and $510_G$, 911-NOW nodes $510_E$ and $510_F$, and 911-NOW nodes $510_F$ and $510_G$. As such, 911-NOW nodes 510 of FIG. 5 communicate to form a wireless mesh network. Although a specific wireless mesh configuration is depicted and described with respect to FIG. 5, 911-NOW nodes 510 may communicate to form various other wireless mesh configurations, and mesh configurations may be modified in real-time as conditions change.

As depicted in FIG. 5, the 911-NOW nodes 510 support wireless communications for one or more management devices 505 (denoted herein as wireless management communications). The wireless management communications include wireless communications between a 911-NOW node 510 and a management device(s) 505 served by that 911-NOW node 510. A 911-NOW node 510 includes one or more wireless management interfaces supporting wireless communications for management device(s) 505. The wireless management communications between management device 505 and 911-NOW node $510_D$ are supported using a wireless management connection 513 established between management device 505 and 911-NOW node $510_D$.

The management device 505 is operable for configuring and controlling standalone 911-NOW network 500. For example, management device 505 may be used to configure and reconfigure one or more of the 911-NOW nodes 510, control access to the 911-NOW nodes, control functions and services supported by the 911-NOW nodes 510, upgrade 911-NOW nodes 510, perform element/network management functions for individual 911-NOW nodes or combinations of 911-NOW nodes (e.g., fault, performance, and like management functions) and the like, as well as various combinations thereof. The management device 505 may be implemented using existing devices (e.g., laptops, PDAs, and the like), or using a newly-designed device adapted to support such management functions. The management device 505 may connect to one or more 911-NOW nodes 510 directly and/or indirectly using wireline and/or wireless interfaces.

The 911-NOW nodes 510 support wireless communications using one or more wireless technologies. For wireless access communications, each 911-NOW node 510 may support one or more different wireless technologies, such as Global System for Mobile Communications (GSM), General Packet Radio Service (GPRS), Evolution-Data Optimized (1xEV-DO), Universal Mobile Telecommunications System (UMTS), High-Speed Downlink Packet Access (HSDPA), Worldwide Interoperability for Microwave Access (WiMAX), and the like. For wireless mesh communications, each 911-NOW node 510 may support Wireless Fidelity (WiFi) or WiMAX technology, microwave technologies, or any other wireless technology. For wireless management communications, each 911-NOW node 510 may support one or more such cellular technologies, and, further, may support WiFi technology, Bluetooth technology, or any other wireless technology.

The wireless communications supported by 911-NOW nodes 510 convey user information, control information, and the like, as well as various combinations thereof. For example, user information may include voice communications (e.g., voice calls, audio conferences, push-to-talk, and the like), data communications (e.g., text-based communications, high-speed data downloads/uploads, file transfers, and the like), video communications (e.g., video broadcasts, conferencing, and the like), multimedia communications, and the like, as well as various combinations thereof. The communications supported by 911-NOW nodes 510 may convey various combinations of content, e.g., audio, text, image, video, multimedia, and the like, as well as various combinations thereof. For example, control information may include network configuration information, network control information, management information and the like, as well as various combinations thereof. Thus, 911-NOW nodes 510 support wireless communication of any information.

Although a specific number of 911-NOW nodes 510 is depicted and described as being deployed to form a 911-NOW network, fewer or more 911-NOW nodes may be deployed to form a 911-NOW network supporting communications required to provide an effective emergency response. Similarly, although a specific configuration of 911-NOW nodes 510 is depicted and described as being deployed to form a 911-NOW network, 911-NOW nodes may be deployed in various other configurations (including different locations at one emergency site or across multiple emergency sites, different combinations of mesh connections between 911-NOW nodes, and the like, as well as various combinations thereof) to form a standalone 911-NOW network supporting RAN functions, CORE networking functions, and various services supporting multimedia communications to provide an effective emergency response.

As described herein, although one or more 911-NOW nodes 510 are capable of forming a fully-functional standalone mesh wireless network without relying on existing infrastructure (fixed or variable), where there is existing infrastructure (that was not damaged or destroyed), the standalone 911-NOW wireless network may leverage the existing network infrastructure to form an integrated 911-NOW wireless network capable of supporting various additional capabilities (e.g., supporting communications with one or more other standalone 911-NOW wireless networks, supporting communications with one or more remote emergency management headquarters, supporting communications with other resources, and the like, as well as various combinations thereof). An integrated 911-NOW wireless network including a mesh 911-NOW network in communication with existing network infrastructure is depicted and described herein with respect to FIG. 6.

Figure 6:
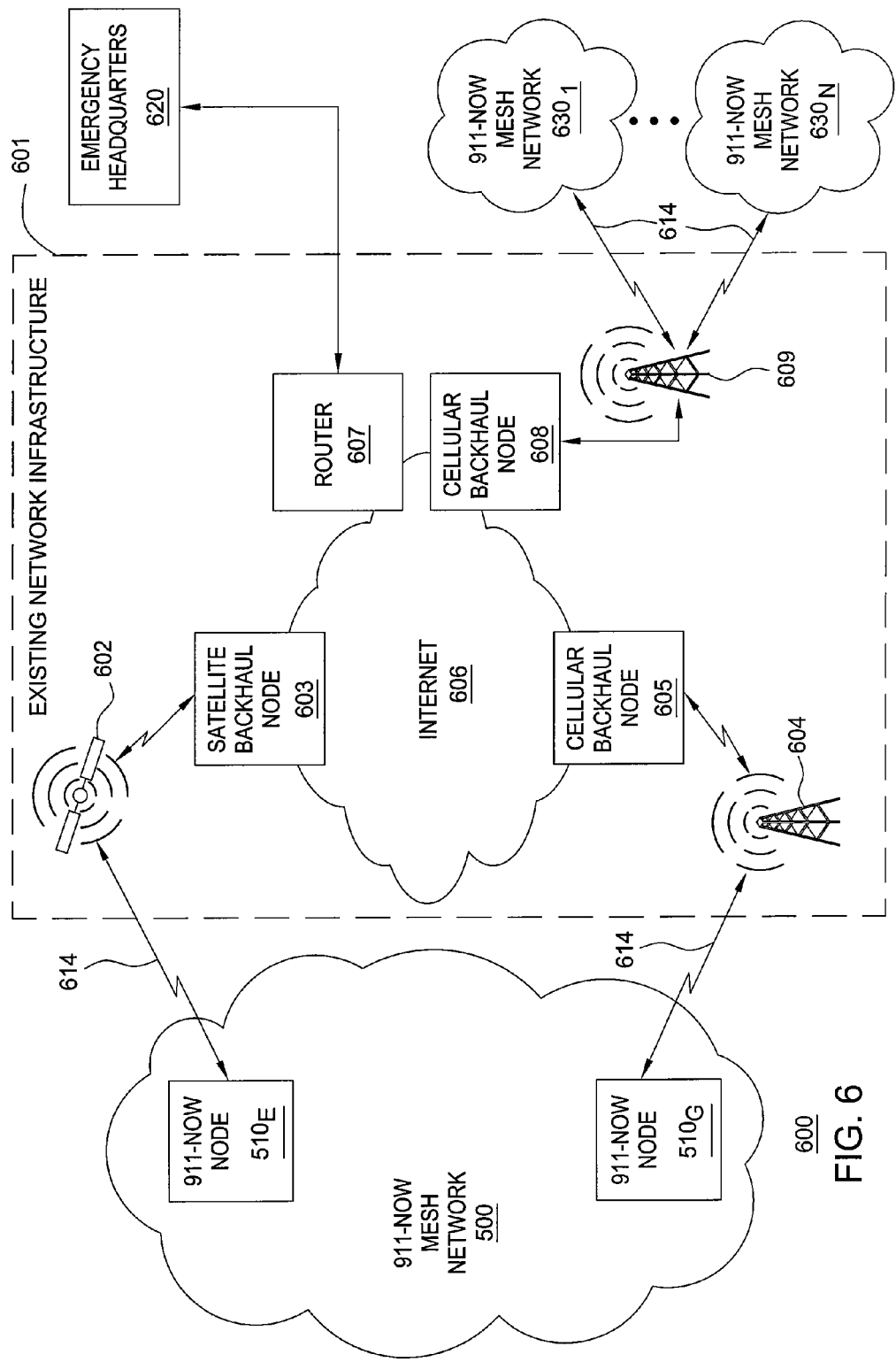
FIG. 6 depicts an integrated 911-NOW communication network architecture that utilizes a 911-NOW mesh network and an existing network infrastructure.

FIG. 6 depicts an integrated 911-NOW communication network architecture including a 911-NOW mesh network and an existing network infrastructure. Specifically, the integrated 911-NOW communication network architecture 600 includes 911-NOW mesh network 500 (depicted and described with respect to FIG. 5) and existing network infrastructure 601. The existing network infrastructure 601 may include any existing communications infrastructure adapted for supporting communications for 911-NOW mesh network 500 (e.g., including wireless communications capabilities, backhaul functions, networking functions, services, and the like, as well as various combinations thereof).

The existing network infrastructure 601 may include wireless access capabilities (e.g., radio access networks, satellite access networks, and the like, as well as various combinations thereof), backhaul capabilities (e.g., public and/or private, wireline and/or wireless, backhaul networks supporting mobility management functions, routing functions, and gateway functions, as well as various other related functions), core networking capabilities (e.g., AAA functions, DNS functions, DHCP functions, call/session control functions, and the like), services capabilities (e.g., application servers, media servers, and the like), and the like, as well as various combinations thereof. Since 911-NOW nodes 510 also supports such capabilities, in some embodiments at least a portion of these capabilities of existing network infrastructure 601 may only be relied upon when necessary.

As depicted in FIG. 6, the existing network infrastructure 601 supports wireless backhaul connections. Specifically, the existing network infrastructure 601 supports two wireless backhaul connections from 911-NOW mesh network 500. The existing network infrastructure 601 supports a first wireless backhaul connection 614 with 911-NOW node $510_E$ using a satellite 602, where satellite 602 is in wireless backhaul communication with a satellite backhaul node 603 at the edge of Internet 606. The existing network infrastructure 601 supports a second wireless backhaul connection 614 with 911-NOW node $510_G$ using a cellular base station 604, where cellular base station in 604 is in wireline backhaul communication with a cellular backhaul node 605 at the edge of Internet 606.

As depicted in FIG. 6, the existing network infrastructure 601 further supports other connections to other locations with which users 502 of emergency site 501 may communicate. The existing network infrastructure 601 includes a router 607 supporting communications for an emergency headquarters 620 (which may include, for example, emergency personnel and/or emergency systems). The existing network infrastructure 601 includes a cellular backhaul node 608 and an associated base station 609 supporting communications for one or more other 911-NOW mesh networks $630_1$-$630_N$ (i.e., one or more other standalone 911-NOW networks established at remote emergency sites).

The existing network infrastructure 601 supports communications for 911-NOW mesh network 500. The existing network infrastructure 601 may support communications between wireless user devices 504 of 911-NOW mesh network 500 (e.g., complementing wireless mesh communications between 911-NOW nodes 510 of the standalone 911-NOW network 500). The existing network infrastructure 601 may support communications between wireless user devices 504 of 911-NOW mesh network 500 and other emergency personnel and/or emergency systems. For example, existing network infrastructure 601 may support communications between wireless user devices 504 of 911-NOW mesh network 500 and an emergency headquarters 620, one or more other 911-NOW mesh networks 630 (e.g., at emergency sites remote from emergency site 501), and the like, as well as various combinations thereof.

As depicted in FIG. 6, in addition to supporting one or more wireless access interfaces, one or more wireless mesh interfaces, and one or more wireless management interfaces, 911-NOW nodes 510 support one or more wireless backhaul interfaces supporting communications between 911-NOW nodes 510 and existing network infrastructure (illustratively, existing network infrastructure 601). The wireless backhaul communications between 911-NOW nodes 510 and existing network infrastructure 601 are supported using wireless backhaul connections 614 established between 911-NOW nodes 510 and existing network infrastructure 601. The wireless backhaul connections 614 may be provided using one or more wireless technologies, such as GSM, GPRS, EV-DO, UMTS, HSDPA, WiFi, WiMAX, microwave, satellite, and the like, as well as various combinations thereof.

The mesh networking capabilities provided by 911-NOW nodes 510, in combination with backhaul networking capabilities provided by 911-NOW nodes 510 using wireless backhaul connections with the existing network infrastructure 601, enable communications between emergency personnel at one emergency site (e.g., between users connected to 911-NOW nodes 510 of a standalone 911-NOW mesh network), between emergency personnel at different emergency sites (e.g., between users connected to 911-NOW nodes 510 of different standalone wireless mesh networks), between emergency personnel at one or more emergency sites and emergency management personnel (e.g., users stationed at emergency headquarters 620), and the like, as well as various combinations thereof.

Thus, 911-NOW nodes 510 may each support four different types of wireless interfaces. The 911-NOW nodes 510 support one or more wireless access interfaces by which user devices 504 may access 911-NOW nodes 510. The 911-NOW nodes 510 support one or more wireless mesh interfaces by which 911-NOW nodes 510 communicate with other 911-NOW nodes 510. The 911-NOW nodes 510 support one or more wireless backhaul interfaces by which the 911-NOW nodes 510 communicate with existing network infrastructure. The 911-NOW nodes 510 support one or more wireless management interfaces by which network administrators may manage the 911-NOW-based wireless network. The functions of a 911-NOW node 510 may be better understood with respect to FIG. 3.

Figure 7:
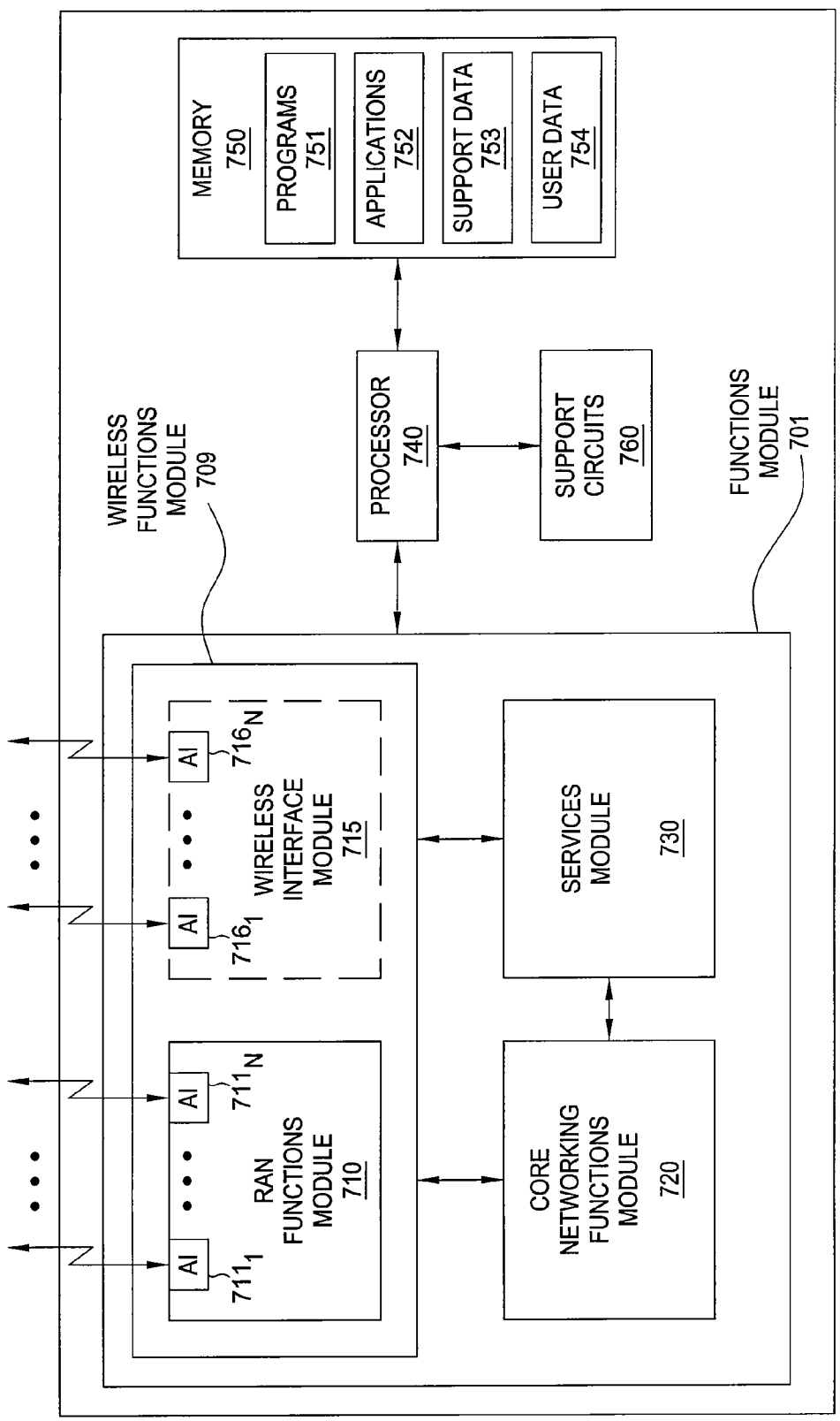
FIG. 7 depicts a high-level block diagram of one embodiment of a 911-NOW node.

FIG. 7 depicts a high-level block diagram of one embodiment of a 911-NOW node. Specifically, as depicted in FIG. 7, 911-NOW node 510 includes a functions module 701, a processor 740, a memory 750, and support circuit(s) 760 (as well as various other processors, modules, storage devices, support circuits, and the like required to support various functions of 911-NOW node 510). The functions module 701 cooperates with processor 740, memory 750, and support circuits 760 to provide various functions of 911-NOW node 510, as depicted and described herein).

The processor 740 controls the operation of 911-NOW node 510, including communications between functions module 701, memory 750, and support circuit(s) 760. The memory 750 includes programs 751, applications 752, support data 753 (e.g., user profiles, quality-of-service profiles, and the like, as well as various combinations thereof), and user data 754 (e.g., any information intended for communication to/from user devices associated with 911-NOW node 510). The memory 750 may store other types of information. The support circuit(s) 760 may include any circuits or modules adapted for supporting functions of 911-NOW node 510, such as power supplies, power amplifiers, transceivers, encoders, decoders, and the like, as well as various combinations thereof.

The functions module 701 includes a wireless functions module 709, a core (CORE) networking functions module 720, and a services module 730. The wireless functions module 709 includes a radio access network (RAN) functions module 710 and, optionally, a wireless interface module 715. The CORE networking functions module 720 provides CORE networking functions. The services module 730 provides one or more services. The RAN functions module 710 (and, when present, wireless interface module 715) communicate with both CORE networking functions module 720 and services module 730, and CORE networking functions module 720 and services module 730 communicate, to provide functions depicted and described herein.

The wireless functions module 709, CORE networking functions module 720, and services module 730 cooperate (in combination with processor 740, memory 750, and support circuits 760, and any other required modules, controllers, and the like, which are omitted for purposes of clarity) to provide a rapidly deployable wireless node which may form: (1) a single-node, standalone wireless network; (2) a multi-node, standalone wireless network (i.e., using wireless mesh connections between 911-NOW nodes); or (3) an integrated wireless network (i.e., using wireless backhaul connections between one or more 911-NOW nodes and existing network infrastructure and, optionally, using wireless mesh connections between 911-NOW nodes).

The RAN functions module 710 provides RAN functions. The RAN functions include supporting one or more wireless access interfaces for communications associated with wireless user devices. Specifically, RAN functions module 710 supports a plurality of air interfaces (AIs) $711_1$-$711_N$ (collectively, AIs 711). The AIs 711 provide wireless access interfaces supporting communications associated with wireless user devices. For example, AIs 711 may support functions typically provided by a base transceiver station (BTS).

The RAN functions module 710 provides control functions. The control functions may include any control functions typically performed by controllers in radio access networks. For example, the control functions may include functions such as admission control, power control, packet scheduling, load control, handover control, security functions, and the like, as well as various combinations thereof. For example, in one embodiment, the control functions may include functions typically performed by RAN network controllers (RNCs) or similar wireless network controllers.

The RAN functions module 710 provides network gateway functions. The network gateway functions may include any functions typically performed in order to bridge RAN and CORE networks, such as IP session management functions, mobility management functions, packet routing functions, and the like, as well as various combinations thereof. For example, where intended for use with CDMA2000-based wireless technology, the network gateway functions may include functions typically performed by a Packet Data Serving Node (PDSN). For example, where intended for use with GPRS-based and/or UMTS-based wireless technology, the network gateway functions may include functions typically performed by a combination of a GPRS Gateway Support Node (GGSN) and a Serving GPRS Support Node (SGSN).

In one embodiment, RAN functions module 710 may be implemented as a base station router (BSR). In one such embodiment, the BSR includes a base station (BS) or one or more modules providing BS functions, a radio network controller (RNC) or one or more modules providing RNC functions, and a network gateway (NG) or one or more modules providing NG functions. In such embodiments, RAN functions module 710 supports any functions typically supported by a base station router.

The wireless interface module 715 provides one or more wireless interfaces. The wireless interfaces provided by wireless interface module may include one or more of: (1) one or more wireless mesh interfaces supporting communications with other 911-NOW nodes; (2) one or more wireless backhaul interfaces supporting communications with existing network infrastructure; and/or (3) one or more wireless management interfaces supporting communications with one or more management devices. The wireless interface module 715 supports a plurality of air interfaces (AIs) $716_1$-$716_N$ (collectively, AIs 716), which provide wireless interfaces supporting communications associated with one or more of: one or more other 911-NOW nodes, existing network infrastructure, and one or more management devices.

In one embodiment, a 911-NOW node 510 is implemented without wireless interface module 715 (e.g., if the 911-NOW node 510 is not expected to require wireless mesh, backhaul, or management capabilities). In one embodiment, a 911-NOW node 510 includes a wireless interface module 715 supporting a subset of: one or more wireless mesh interfaces, one or more wireless backhaul interfaces, and one or more wireless management interfaces (i.e., the 911-NOW node is tailored depending on whether the 911-NOW node 510 will require wireless management, mesh, and/or backhaul capabilities). In one embodiment, a 911-NOW node 510 includes a wireless interface module 715 supporting each of: one or more wireless mesh interfaces, one or more wireless backhaul interfaces, and one or more wireless management interfaces (i.e., all types of wireless interfaces are available should the 911-NOW node 510 require such wireless capabilities).

The CORE networking functions module 720 provides networking functions typically available from the CORE network. For example, CORE networking functions module 720 may provide authentication, authorization, and accounting (AM) functions, domain name system (DNS) functions, dynamic host configuration protocol (DHCP) functions, call/session control functions, and the like, as well as various combinations thereof. One skilled in the art knows which functions are typically available from the CORE network.

The services module 730 provides services. The services may include any services capable of being provided to wireless user devices. In one embodiment, for example, services module 730 may provide services typically provided by application servers, media servers, and the like, as well as various combinations thereof. For example, services may include one or more of voice services, voice conferencing services, data transfer services (e.g., high-speed data downloads/uploads, file transfers, sensor data transfers, and the like), video services, video conferencing services, multimedia services, multimedia conferencing services, push-to-talk services, instant messaging services, and the like, as well as various combinations thereof. One skilled in the art knows which services are typically available over RAN and CORE networks.

Although primarily depicted and described herein with respect to a specific configuration of a 911-NOW node including three modules providing wireless functions (including RAN functions and, optionally, additional wireless interfaces and associated interface functions), CORE networking functions, and services, respectively, 911-NOW nodes may be implemented using other configurations for providing wireless functions, CORE networking functions, and services. Similarly, although primarily depicted and described herein with respect to a specific configuration of a functions module providing specific wireless functions, CORE networking functions, and services, functions modules of 911-NOW nodes may be implemented using other configurations for providing wireless functions, CORE networking functions, and services.

Therefore, it is contemplated that at least a portion of the described functions may be distributed across the various functional modules in a different manner, may be provided using fewer functional modules, or may be provided using more functional modules. Furthermore, although primarily depicted and described with respect to specific wireless functions (including RAN functions and, optionally, one or more additional wireless interface functions), CORE networking functions, and services, it is contemplated that fewer or more wireless functions (including RAN functions, optionally, and one or more additional wireless interface functions), CORE networking functions, and/or services may be supported by a 911-NOW node. Thus, 911-NOW nodes are not intended to be limited by the example functional architectures depicted and described herein with respect to FIG. 7.

Figure 8:
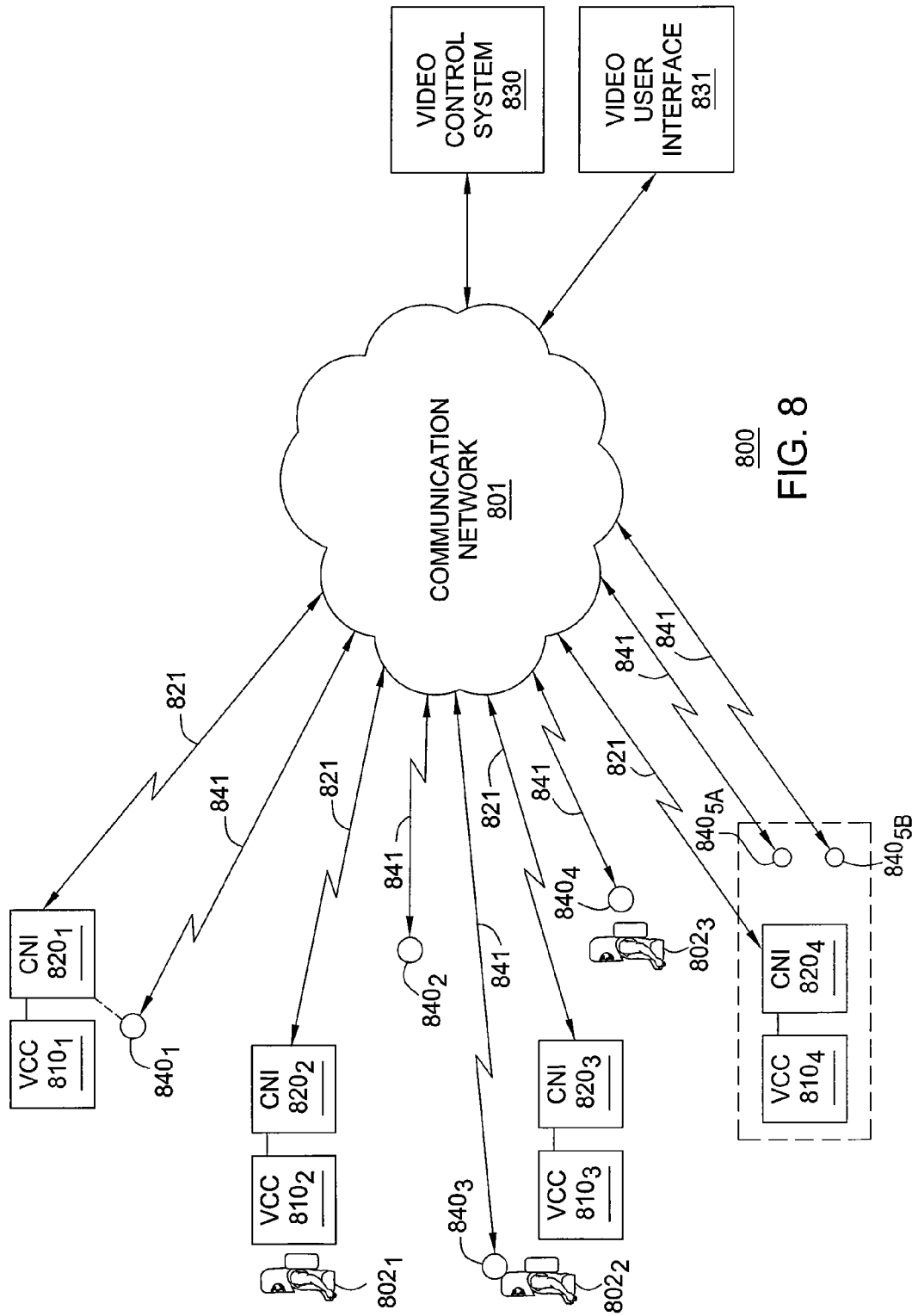
FIG. 8 depicts a network architecture according to one embodiment in which the present invention is used in an emergency response situation.

FIG. 8 depicts a network architecture according to one embodiment in which the present invention is used in an emergency response situation. As depicted in FIG. 8, a communication network 801 supports communications between user devices, a video control system, and a video user interface. The communication network 801 is any communication network operable for propagating streaming videos, control messages, and any other information associated with the present invention. In one embodiment, the communication network 801 may be a standalone 911-NOW-based (as depicted and described with respect to FIG. 5) or an integrated 911-NOW-based network (as depicted and described with respect to FIG. 6). Although primarily depicted and described with respect to a rapidly deployable wireless network, the present invention may be implemented using any wireless and/or wireline network(s).

As depicted in FIG. 8, user devices include video camera controllers and monitoring devices. The video camera controllers include any devices capable of capturing video (as well as other content, such as audio, still images, and the like, as well as various combinations thereof), generating video streams, and transmitting the video streams to one or more video user interfaces. For example, each video camera controller may include a video camera and an associated video camera interface (e.g., similar to VCs 111 and VCIs 112 of VCCs 110 depicted and described with respect to FIG. 1). The video camera controllers may cooperate with devices capable of enabling the video camera controllers to interface with a communication network (e.g., communication network interface devices similar to the CNIs 120 depicted and described with respect to FIG. 1). A monitoring device is any devices capable of monitoring one or more conditions (e.g., physical condition of emergency responders, environmental conditions of an emergency site, and the like, as well as various combinations thereof).

As depicted in FIG. 8, the depicted emergency site includes a plurality of emergency responders 802 (collectively, emergency responders 802, which may also be referred to herein as emergency personnel). The emergency site includes a plurality of VCCs $810_1$-$810_4$ (collectively, VCCs 810) and an associated plurality of CNIs $820_1$-$820_4$ (collectively, CNIs 820), which may be collectively referred to herein with respect to FIG. 8 as a video camera system. The emergency site includes a plurality of monitoring devices (MDs) $840_1$-$840_5$ (collectively, MDs 840). The emergency responders 802, video camera systems (i.e., VCCs 810 and associated CNIs 820), and MDs 840 may be deployed across the emergency site in any configuration, which includes standalone configurations, as well as configurations involving associations between different combinations of emergency responders 802, VCCs 810 and MDs 840.

In one embodiment, for example, some of the video camera systems may be directly associated with one or more emergency responders 802. For example, some of the video camera systems may be hand carried by the emergency responders 802, mounted on some equipment carried by, or otherwise associated with, the emergency responders 802 (e.g., mounted on a helmet, carried in a backpack, and the like), and the like, as well as various combinations thereof. For example, as depicted in FIG. 8, the video camera system including VCC $810_3$ and CNI $820_3$ is directly associated with emergency responder $802_2$. Although a video camera system may be associated with a particular emergency responder 802 (i.e., in that the emergency responder is responsible for that video camera system), any emergency responder 802 may use any video camera system.

In one embodiment, for example, some of the video camera systems may be deployed as standalone video camera systems not associated with any particular emergency responders 802. As one example, emergency responders 802 may set up video camera systems (including pairs of VCCs 810 and CNIs 820) at different locations of the emergency site (and then move about the emergency site without those video camera systems). As another example, emergency responders 802 may set up video camera systems to capture videos of interest (e.g., to capture video of specific locations of the emergency site, such as specific buildings, specific views of the emergency site, and the like, as well as various combinations thereof). For example, VCCs $810_1$, $810_2$, and $810_4$ and corresponding CNIs $820_1$, $820_2$, and $820_4$, respectively, are deployed as standalone video camera systems not associated with any particular emergency responders 802 (although the video camera system including VCC $810_1$ and CNI $820_1$ is associated with MD $840_1$ and the video camera system including VCC $810_4$ and CNI $820_4$ is associated with MD $840_5$).

In one embodiment, for example, some of the video camera systems may be directly associated with one or more MDs 840. In one example, some of the video camera systems may be deployed along with associated MDs 840. For example, as depicted in FIG. 8, the video camera system including VCC $810_1$ and CNI $820_1$ is associated with MD $840_1$, and the video camera system including VCC $810_4$ and CNI $820_4$ is associated with MDs $840_{5A}$ and $840_{5B}$. In another example, some of the video camera systems may be hand carried by the emergency responders 802, mounted on some equipment associated with the emergency responders 802 (e.g., mounted as a helmet-cam), and the like, where the emergency responders 802 are also carrying one or more MDs 840. For example, as depicted in FIG. 8, video camera system including VCC $810_3$ and CNI $820_3$, as well as MD $840_3$, are both carried by emergency responder $802_2$.

In one embodiment, for example, some of the video camera systems may be deployed as standalone video camera systems not associated with emergency responders 802 or any particular MDs 840. As one example, emergency responders 802 may set up video camera systems at different locations of the emergency site that are not associated with any MDs 840. As another example, emergency responders 802 may set up video camera systems to capture videos of interest (e.g., to capture video of specific locations of the emergency site, such as specific buildings, specific views of the emergency site, and the like, as well as various combinations thereof). For example, as depicted in FIG. 8, the video camera system including VCC $810_2$ and CNI $820_2$ is deployed as a standalone video camera system not associated with any of the emergency responders 802 or any particular MD(s) 840.

As depicted in FIG. 8, one or more emergency responders 802 and/or one or more MDs 840 may also be deployed to the emergency site such that emergency responder(s) 802 and/or MD(s) 840 are not associated with any particular video camera system. As one example, emergency responder $802_1$ is not associated with any video camera system; rather, emergency responder $802_1$ may move about the emergency site and use any of the video camera systems as needed. As another example, MD $840_2$ is deployed at the emergency site such that it is not associated with any emergency responder 802 or any video camera system (although if MD $840_2$ detects some condition that warrants a high-quality video stream, one or more of the video camera systems nearest to MD $840_2$ may be identified and requested to provide a high-quality video stream in response to the detected condition).

In other words, from the embodiments and examples depicted and described with respect to FIG. 8, it is clear that any combination of emergency responders 802, video camera systems including VCCs 810 and CNIs 820, and MDs 840 may be deployed. The emergency responders 802 may carry no video camera systems and no MDs 840, one or more video camera systems and no MDs 840, one or more MDs 840 and no video camera systems, or one or more video camera systems and one or more MDs 840. The video camera systems may be associated with emergency responders 802 and/or MDs 840, or may be deployed as standalone video camera systems not associated with any emergency responders 802 or MDs 840. The MDs 840 may be associated with emergency responders 802 and/or video camera systems, or deployed as standalone MDs 840 not associated with any emergency responders 802 or video camera systems.

As described herein, the video camera systems include pairs of VCCs 810 and CNIs 820. The VCCs 810 and CNIs 820 operate in a manner similar to VCCs 110 and CNIs 120 depicted and described herein with respect to FIG. 1. For example, the video control systems capture video, generate video streams for conveying captured video, and propagate the generated video streams toward a video user interface (VUI) 831 which is similar to VUI 131 depicted and described with respect to FIG. 1. The video camera systems receive and process control messages from VCS 830 for controlling the level of quality of video streams provided from those video camera systems to VUI 831. More specifically, VCCs 810 capture video and CNIs 820 operate as interfaces between respective VCCs 810 and the communication network by which VCCs 810 communicate with VUI 831.

The CNIs 820 communicate with VCS 830 and VUI 831 (e.g., receiving control messages from VCS 830, streaming video streams to VUI 831, and the like) in any manner for supporting such communications (e.g., using wireless and/or wireline communications). As depicted in FIG. 8, CNIs 820 access communication network 801 using respective access connections 821. Although primarily depicted and described herein with respect to accessing communication network 801 using wireless access connections 821, one or more of the CNIs 820 may alternatively access communication network 801 using wireline access connections. As described herein, in one embodiment, communication network 801 may be implemented as a 911-NOW-based network.

The MDs 840 include any devices capable of monitoring one or more parameters, conditions, and the like. In one embodiment, MDs 840 include detectors, monitors, sensors, and the like, as well as various combinations thereof. For example, MDs 840 may include audio detectors (e.g., which can detect when a user begins speaking, which can detect various different noises, and the like, as well as various combinations thereof), motion detectors, health monitors (e.g., for monitoring such conditions as breathing, heart rate, temperature, and the like, as well as various combinations thereof), environmental sensors (e.g., sound sensors, temperature sensors, heat sensors, pressure sensors, light sensors, proximity sensors, sensors capable of detecting biological agents, chemical agents, and radiation, and the like), and the like, as well as various combinations thereof.

The MDs 840 collect data (where the type of data collected, frequency with which data is collected, quantity of data collected, format in which data is collected, and like parameters, may vary for different types of MDs 840). In one embodiment, one or more of MDs 840 may process collected data in order to determine whether a condition (or conditions) is satisfied. The MDs 840 provide collected data (and/or processed data) to VCS 830. In one embodiment, in which MDs 840 process collected data in order to monitor for the presence or occurrence of one or more conditions, MDs 840 may provide messages indicative of detected conditions to VCS 830 (in place of, or in combination with, the collected data from which the condition is detected).

In one example, a temperature monitor may take temperature readings once every ten seconds and provide the temperature reading to VCS 830. In another example, a breathing monitor may continuously monitor breathing of an emergency responder, process the breathing data to determine whether the breathing falls within a desirable range, and report a breathing problem to VCS 830 if a breathing problem is detected. In another example, a chemical agent sensor may monitor for presence of a particular chemical agent(s), and only report the presence of the chemical agent to VCS 830 if a threshold level of the chemical is detected. In other words, MDs 840 may provide various types of information to VCS 830 for use in determining whether an event is detected.

The MDs 840 provide collected data (and, optionally, indications of detected conditions) to VCS 830 in any manner for communicating such information (e.g., using wireless and/or wireline communications). As depicted in FIG. 8, the MDs 840 access communication network 801 using respective access connections 841 (which are depicted and described herein as wireless access connections). Although primarily depicted and described herein with respect to accessing communication network 801 using wireless access connections 841, one or more of the MDs 840 may access communication network 801 using wireline access connections. The communication network 801 propagates information from MDs 840 to VCS 830. In one embodiment, communication network 801 may be implemented as a 911-NOW-based network.

In one embodiment, for example, in which communication network 801 is implemented using a 911-NOW based network (e.g., as standalone 911-NOW network 500 of FIG. 5 or integrated 911-NOW network 600 of FIG. 6), VCCs 810 and MDs 840 communication with 911-NOW nodes 510 using wireless access connections, and 911-NOW nodes 510 communicate with VCS 830 using various combinations of wireless mesh connections, wireless backhaul connections using existing network infrastructure (which may include wireless and/or wireline infrastructure), and the like, as well as various combinations thereof.

The VCS 830 is a system operable for detecting events which trigger VCS 830 to generate control messages adapted for requesting VCCs 810 to modify the level of quality with which the VCs 810 provide video streams to VUI 131. The event may be any event which may trigger VCS 830 to request one (or more) of VCCs 810 to switch from providing a video at a first level of quality to providing the video at a second level of quality. As described herein, the event may be a user request to receive the video with a certain level of quality, may be detected by VCS 830 by processing the low-quality video stream received from the VCS 810, and the like, as well as various combinations thereof. In one embodiment, as depicted and described with respect to FIG. 8, the event may be detected by VCS 830 by processing data received from one or more monitoring devices (illustratively, MDs 840).

As one example, assuming MD $840_3$ is a temperature sensor, VCS 830 may detect an event in response to a large increase in temperature measured by MD $840_3$, thereby triggering VCS 830 to request that VCC $810_3$ switch from providing a low-quality video stream to providing a high-quality video stream to VUI 831. As another example, assuming MD $840_3$ is a chemical sensor, VCS 830 may detect an event in response detection of a threshold amount of sarin nerve gas by MD $840_3$, thereby triggering VCS 830 to request that VCC $810_3$ switch from providing a low-quality video stream to providing a high-quality video stream to VUI 831. As another example, assuming MD $840_3$ is a health monitor, VCS 830 may detect an event in response to a decrease in the heart rate of emergency responder $802_2$ that is measured by MD $840_3$, thereby triggering VCS 830 to request that VCC $810_3$ switch from providing a high-quality video stream to providing a low-quality video stream to VUI 831.

Figure 9:
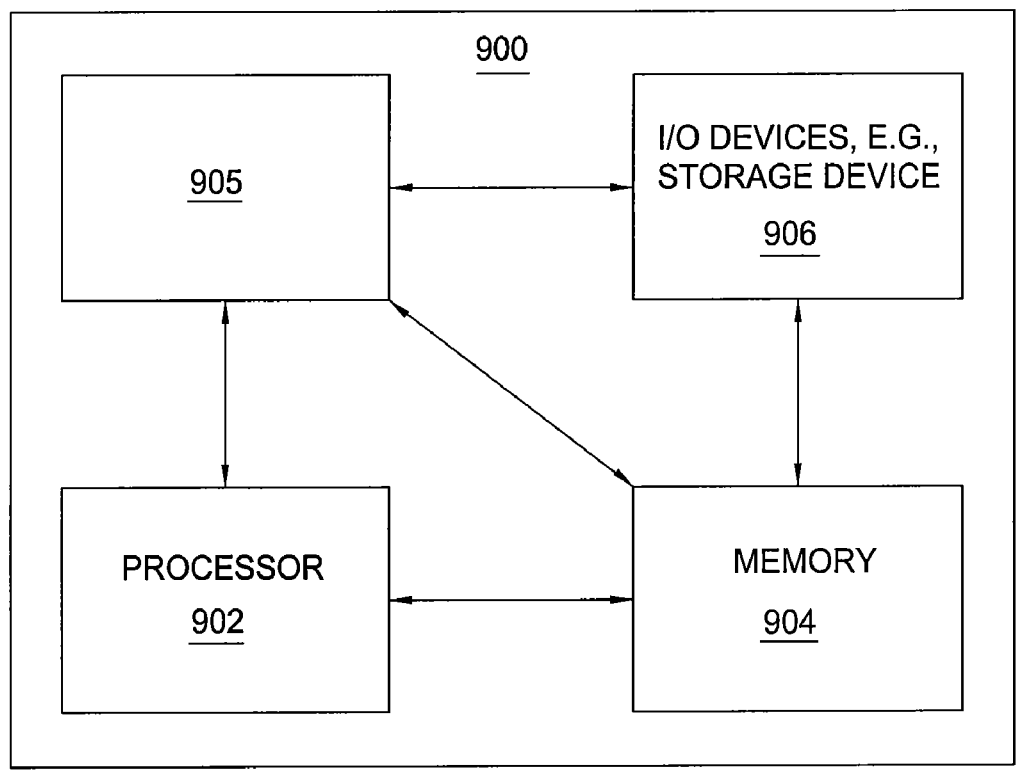
FIG. 9 depicts a high-level block diagram of a general-purpose computer suitable for use in performing the functions described herein.

FIG. 9 depicts a high-level block diagram of a general-purpose computer suitable for use in performing the functions described herein. As depicted in FIG. 9, system 900 comprises a processor element 902 (e.g., a CPU), a memory 904, e.g., random access memory (RAM) and/or read only memory (ROM), a video control module 905, and various input/output devices 906 (e.g., storage devices, including but not limited to, a tape drive, a floppy drive, a hard disk drive or a compact disk drive, a receiver, a transmitter, a speaker, a display, an output port, and a user input device (such as a keyboard, a keypad, a mouse, and the like)).

It should be noted that the present invention may be implemented in software and/or in a combination of software and hardware, e.g., using application specific integrated circuits (ASIC), a general purpose computer or any other hardware equivalents. In one embodiment, the present video control process 905 can be loaded into memory 904 and executed by processor 902 to implement the functions as discussed above. Thus, video control process 905 (including associated data structures) of the present invention can be stored on a computer readable medium or carrier, e.g., RAM memory, magnetic or optical drive or diskette, and the like.

Although primarily depicted and described herein with respect to using rapidly deployable nodes (such as 911-NOW nodes depicted and described herein) to deploy a wireless network in emergency response situations, rapidly deployable nodes may be used to deploy a wireless network in various other situations. In one embodiment, rapidly deployable nodes may be used in large-crowd environments. For example, rapidly deployable nodes may be deployed during large-crowd events, such as sporting events (e.g., in a city hosting the Super Bowl, in a city hosting the Olympics, and the like), concerts, and the like. In one embodiment, rapidly deployable nodes may be used as a rapid replacement network for commercial cellular networks (i.e., to replace existing network infrastructure while such infrastructure is unavailable). In one embodiment, rapidly deployable nodes may be used in military environments (e.g., to form a rapidly deployable network on the battlefield or in other situations).

Therefore, rapidly deployable nodes according to the present invention are useful for various other applications in addition to emergency response applications, and, thus, may be deployed in various other situations in addition to emergency situations. Thus, the term "emergency site", which is used herein to denote the geographical location in which one or more rapidly deployable nodes may be deployed to form a wireless network, may be more commonly referred to as a "network site" (i.e., the site at which the rapidly deployable wireless network is deployed to support wireless communications). Similarly, other terms primarily associated with emergency applications may be referred to more generally depending upon the application in which rapidly deployable nodes are deployed. In other words, any number of rapidly deployable nodes according to the present invention may be deployed to any geographical location to form a wireless network for any reason.

Furthermore, although the present invention was further described within the context of a specific embodiment in which the present invention is implemented in a rapidly deployable wireless network, as described herein the present invention may be used in various other applications in which multiple video streams are propagated over a communication network for review using one or more video user interfaces. Moreover, although primarily depicted and described herein with respect to providing video stream quality control functions using a specific network architecture, the present invention may be used to provide video stream quality control functions in any type of network (e.g., commercial wireless networks, ad hoc wireless networks, wireline networks, and the like, as well as various combinations thereof). Therefore, the present invention is not intended to be limited by the application of the invention, communications technologies used to support the invention, and like factors.

It is contemplated that some of the steps discussed herein as software methods may be implemented within hardware, for example, as circuitry that cooperates with the processor to perform various method steps. Portions of the present invention may be implemented as a computer program product wherein computer instructions, when processed by a computer, adapt the operation of the computer such that the methods and/or techniques of the present invention are invoked or otherwise provided. Instructions for invoking the inventive methods may be stored in fixed or removable media, transmitted via a data stream in a broadcast or other signal bearing medium, and/or stored within a working memory within a computing device operating according to the instructions.

Although various embodiments which incorporate the teachings of the present invention have been shown and described in detail herein, those skilled in the art can readily devise many other varied embodiments that still incorporate these teachings.

What is claimed is:

1. A method for controlling video stream quality levels for video streams provided by video camera controllers, comprising:

monitoring for an event associated with one of a plurality of video camera controllers providing a plurality of video streams, each of the video streams being provided at least at a first quality level, at least one of the video streams being provided at a second quality level greater than the first quality level;

when an event associated with one of the plurality of video camera controllers is detected, determining whether an additional video stream at the second quality level can be supported;

in response to a determination that an additional video stream at the second quality level cannot be supported, determining whether to request that the one of the video camera controllers for which the event is detected switch from providing the video stream at the first quality level to providing the video stream at the second quality level;

in response to a determination to request that the one of the video camera controllers for which the event is detected switch from providing the video stream at the first quality level to providing the video stream at the second quality level;

propagating, toward the one of the video camera controllers for which the event is detected, a control message configured to request the one of the video camera controllers for which the event is detected to switch from providing the video stream at the first quality level to providing the video stream at the second quality level; and selecting one of the video camera controllers providing a video stream at the second quality level, and propagating, toward the selected one of the video camera controllers, a control message configured to request the selected one of the video camera controllers to switch from providing the video stream at the second quality level to providing the video stream at the first quality level.

2. The method of claim 1, wherein detecting the event comprises at least one of:
   detecting a request by a user to receive the video stream at the second quality level; and
   processing the video stream from the one of the video camera controllers to determine content of the video stream, and detecting at least one condition associated with the content of the processed video stream.

3. The method of claim 1, wherein detecting the event comprises:
   receiving data from a monitoring device; and
   processing the received data to detect the event.

4. The method of claim 3, wherein the event comprises at least one of a start of audio, a change of temperature, a motion, a presence of a biological agent, a presence of a chemical agent, and a presence of radiation.

5. The method of claim 1, further comprising:
   before detecting the event, presenting at least a portion of the received video streams having the first quality level, wherein each of the presented video streams is presented as a video thumbnail.

6. The method of claim 1, further comprising:
   after detecting the event, continuing to present at least a portion of the video streams having the first quality level, wherein each of the video streams having the first quality level is presented as a video thumbnail.

7. The method of claim 1, wherein the first quality level comprises a first video rate and a first video resolution and the second quality level comprises a second video rate and a second video resolution.

8. The method of claim 1, wherein determining whether an additional video stream at the second quality level can be supported comprises at least one of:
   determining whether there is sufficient network capacity to support an additional video stream at the second quality level; and
   determining whether a video control system receiving the video streams is capable of supporting an additional video stream at the second quality level.

9. The method of claim 1, wherein determining whether to request that the one of the video camera controllers for which the event is detected switch from providing the video stream at the first quality level to providing the video stream at the second quality level comprises:
   for each of the video camera controllers providing a video stream at the second quality level, comparing at least one parameter associated with the video camera controller providing the video stream at the second quality level with at least one corresponding parameter associated with the one of the video camera controllers for which the event is detected.

10. The method of claim 9, wherein the at least one parameter comprises at least one of an order in which events are detected, a priority of detected events, an indication as to whether or not the detected event was triggered by a user, priorities associated to video camera controllers, and characteristics of content of the video streams.

11. The method of claim 1, wherein selecting one of the video camera controllers providing a video stream at the second quality level comprises:
   for each of the video camera controllers providing a video stream at the second quality level, determining at least one parameter associated with the video camera controller providing the video stream at the second quality level; and
   selecting one of the video camera controllers providing a video stream at the second quality level based at least in part on a comparison of the determined parameters.

12. An apparatus for controlling video stream quality levels for video streams provided by video camera controllers, comprising:
   a processor and a memory, the processor configured to:
   monitor for an event associated with one of a plurality of video camera controllers providing a plurality of video streams, each of the video streams being provided at least at a first quality level, at least one of the video streams being provided at a second quality level greater than the first quality level;
   when an event associated with one of the plurality of video camera controllers is detected, determine whether an additional video stream at the second quality level can be supported;
   in response to a determination that an additional video stream at the second quality level cannot be supported, determine whether to request that the one of the video camera controllers for which the event is detected switch from providing the video stream at the first quality level to providing the video stream at the second quality level;
   in response to a determination to request that the one of the video camera controllers for which the event is detected switch from providing the video stream at the first quality level to providing the video stream at the second quality level:
      propagate, toward the one of the video camera controllers for which the event is detected, a control message configured to request the one of the video camera controllers to switch from providing the video stream at the first quality level to providing the video stream at the second quality level; and
      select one of the video camera controllers providing a video stream at the second quality level, and propagate, toward the selected one of the video camera controllers, a control message configured to request the selected one of the video camera controllers to switch from providing the video stream at the second quality level to providing the video stream at the first quality level.

13. The apparatus of claim 12, wherein the processor is configured to detect the event using at least one of:
   detecting a request by a user to receive the video stream at the second quality level; and
   processing the video stream from the one of the video camera controllers to determine content of the video stream, and detecting at least one condition associated with the content of the processed video stream.

14. The apparatus of claim 12, wherein the processor is configured to detect the event by:
   receiving data from a monitoring device; and
   processing the received data to detect the event.

15. The apparatus of claim 14, wherein the event comprises at least one of a start of audio, a change of temperature, a temperature satisfying a threshold, a motion, a presence of a biological agent, a presence of a chemical agent, and a presence of radiation.

16. The apparatus of claim 12, wherein the processor is configured to:
- before detecting the event, present at least a portion of the received video streams having the first quality level, wherein each of the presented video streams is presented as a video thumbnail.

17. The apparatus of claim 12, wherein the processor is configured to:
- after detecting the event, continue to present at least a portion of the video streams having the first quality level, wherein each of the video streams having the first quality level is presented as a video thumbnail.

18. The apparatus of claim 12, wherein the first quality level comprises a first video rate and a first video resolution and the second quality level comprises a second video rate and a second video resolution.

19. The apparatus of claim 12, wherein, to determine whether an additional video stream at the second quality level can be supported, the processor is configured to perform at least one of:
- determine whether there is sufficient network capacity to support an additional video stream at the second quality level; and
- determine whether a video control system receiving the video streams is capable of supporting an additional video stream at the second quality level.

20. The apparatus of claim 12, wherein, to determine whether to request that the one of the video camera controllers for which the event is detected switch from providing the video stream at the first quality level to providing the video stream at the second quality level, the processor is configured to:
- for each of the video camera controllers providing a video stream at the second quality level, compare at least one parameter associated with the video camera controller providing the video stream at the second quality level with at least one corresponding parameter associated with the one of the video camera controllers for which the event is detected.

21. The apparatus of claim 20, wherein the at least one parameter comprises at least one of an order in which events are detected, a priority of detected events, an indication as to whether or not the detected event was triggered by a user, priorities associated to video camera controllers, and characteristics of content of the video streams.

22. The apparatus of claim 12, wherein, to select one of the video camera controllers providing a video stream at the second quality level, the processor is configured to:
- for each of the video camera controllers providing a video stream at the second quality level, determine at least one parameter associated with the video camera controller providing the video stream at the second quality level; and
- select one of the video camera controllers providing a video stream at the second quality level based at least in part on a comparison of the determined parameters.

* * * * *